(12) United States Patent
De Kubber et al.

(10) Patent No.: US 11,337,377 B2
(45) Date of Patent: May 24, 2022

(54) PLANT GROWTH SUBSTRATES

(71) Applicant: Rockwool International A/S, Hedehusene (DK)

(72) Inventors: Daan Louis De Kubber, XR Roermond (NL); Frank Hendrikus Peter Janssen, ES Helden (NL)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 334 days.

(21) Appl. No.: 14/367,396

(22) PCT Filed: Dec. 21, 2012

(86) PCT No.: PCT/EP2012/076824
§ 371 (c)(1),
(2) Date: Jun. 20, 2014

(87) PCT Pub. No.: WO2013/093086
PCT Pub. Date: Jun. 27, 2013

(65) Prior Publication Data
US 2015/0128492 A1   May 14, 2015

(30) Foreign Application Priority Data
Dec. 22, 2011   (EP) ..................................... 11195448

(51) Int. Cl.
*A01G 9/02* (2018.01)
*A01G 31/00* (2018.01)
*A01G 24/18* (2018.01)

(52) U.S. Cl.
CPC ............. *A01G 9/021* (2013.01); *A01G 31/00* (2013.01); *A01G 24/18* (2018.02)

(58) Field of Classification Search
CPC .......... A01G 2031/0005; A01G 9/1086; A01G 31/001; A01G 9/10; A01G 24/00; A01G 24/44; A01G 24/46; A01G 24/18
See application file for complete search history.

(56) References Cited

U.S. PATENT DOCUMENTS

| | | | | |
|---|---|---|---|---|
| 5,009,031 A | * | 4/1991 | Knop | D04H 1/4209 47/64 |
| 5,129,181 A | * | 7/1992 | Kafka | A01G 31/001 47/64 |
| 5,133,151 A | * | 7/1992 | Blok | A01G 31/02 47/62 R |

(Continued)

FOREIGN PATENT DOCUMENTS

| | | |
|---|---|---|
| EP | 0403348 A1 | 12/1990 |
| EP | 0628243 A1 | 12/1994 |

(Continued)

OTHER PUBLICATIONS

Anonymous: "What to know about the Uni-Slab." Grodan, Dec. 13, 2011 (Dec. 13, 2011), pp. 1-2. Retrieved from the internet: URL:https://web.archive.org/web/20111213114253/http://grodan101.com/growing-tips/grow/what-know-about-uni-slab. Retrieved on Sep. 5, 2016.

(Continued)

*Primary Examiner* — Christopher D Hutchens
(74) *Attorney, Agent, or Firm* — Tarolli, Sundheim, Covell & Tummino LLP

(57) ABSTRACT

A man-made vitreous fibre (MMVF) plant growth substrate is provided. The substrate has properties including a volume of 3 to 20 litres, two layers of differing density, and the use of an organic binder selected from formaldehyde free binders. This is found to provide a substrate which allows excellent control of the water and/or nutrient contents within the substrate when used for plant growth.

21 Claims, 13 Drawing Sheets

(56) References Cited

U.S. PATENT DOCUMENTS

| | | | | |
|---|---|---|---|---|
| 5,992,093 | A | * | 11/1999 | De Groot ............ A01G 31/001 47/59 R |
| 7,104,006 | B1 | * | 9/2006 | Blaakmeer ............ A01G 24/00 47/59 S |
| 2006/0117658 | A1 | * | 6/2006 | Holmenlund .......... A01G 27/04 47/79 |
| 2009/0019765 | A1 | * | 1/2009 | Kosinski ............ A01G 9/1086 47/64 |
| 2011/0120005 | A1 | * | 5/2011 | King ................ A01G 31/02 47/62 N |
| 2011/0167726 | A1 | * | 7/2011 | Bouwens ............ A01G 24/00 47/59 S |
| 2011/0179711 | A1 | * | 7/2011 | Cuypers ............ A01G 31/001 47/59 S |
| 2011/0190425 | A1 | * | 8/2011 | Swift ................ C08J 5/04 524/35 |
| 2013/0263508 | A1 | * | 10/2013 | Cuypers ............ A01G 24/00 47/59 S |
| 2015/0150197 | A1 | * | 6/2015 | De Kubber ............ A01G 31/00 47/65.5 |

FOREIGN PATENT DOCUMENTS

| | | | | |
|---|---|---|---|---|
| EP | 1047645 | | 7/1999 | |
| EP | 1382642 | A1 | 2/2004 | |
| EP | 2111746 | A1 * | 10/2009 | ........ A01G 31/001 |
| JP | 9271278 | | 10/1997 | |
| WO | WO-9603858 | A1 * | 2/1996 | ........ A01G 24/00 |
| WO | WO 03042642 | A1 * | 5/2003 | ........ G01G 11/003 |
| WO | 2007129202 | A1 | 11/2007 | |
| WO | 2008009467 | A1 | 1/2008 | |
| WO | 2008028923 | A1 | 3/2008 | |

OTHER PUBLICATIONS

Examination Report for the corresponding European Patent Application No. 12808412.6, dated Jun. 1, 2018, pp. 1-6.

\* cited by examiner

| Per 9 plants | Value | Conventional | New | New/Conv.(%) |
|---|---|---|---|---|
| Gift | l | 1006 | 736 | 76 |
| Drain | l | 307 | 158 | 51 |
| Uptake | l | 700 | 606 | 87 |
| Uptake efficiency | % | 70 | 79 | |
| Drain | % | 30 | 21 | |

PLANT GROWTH SUBSTRATES

FIELD OF THE INVENTION

The present invention relates to the growth of plants in artificial substrates. In particular, but not exclusively, the present invention relates to the growth of plants in mineral wool substrates.

BACKGROUND TO THE INVENTION

It is known that plants can be grown in mineral wool growth substrates. Such growth substrates are typically provided as a coherent plug, block, slab or mat/blanket and generally include a binder, usually an organic binder, in order to provide structural integrity to the product.

Typically, the growth process of the plant is managed in two stages: a first stage managed by a "propagator" in which the plant is grown from seed; and a second stage managed by a "grower" during which the plant is sustained and any harvest taken. For example, in the case of the tomato plant, the propagator may plant individual tomato seeds in cylindrical plugs having a thickness in the order of 25-30 mm and a radius of around 20-30 mm. After germination of the seed, the propagator places the plug within a cuboid block to allow further growth of the root system and the plant. The individual plant within the block is then nursed until a stage when it can be transferred from the propagator to the grower.

Although typically only a single plant is provided in each block, it is possible for multiple plants to be provided in a single block. In some examples, a single plant in a block is split into two by splitting a stem during an early phase of growth, resulting in two plants sharing a single root system. In another alternative, multiple plants may be grafted together and grown within a single block.

The use of a separate plug and block by the propagator is not essential for all plants, but has been described, for example, in European patent application EP2111746, as providing a number of advantages. In particular, the small size of the plug allows more regular watering of the plant in the initial stage without saturating its substrate.

After they are received from the propagator, the grower places a number of blocks on a single slab of mineral wool to form a plant growth system. The slab of mineral wool is typically encased in a foil or other liquid impermeable layer except for openings on an upper surface for receiving the blocks with the plants and a drain hole provided on the bottom surface.

During subsequent growth of the plant, water and nutrients are provided using drippers which deliver a liquid containing water and nutrients to the system either directly to the blocks or to the slabs. The water and nutrients in the blocks and slabs is taken up by the roots of the plants and the plants grow accordingly. Water and nutrients which are not taken up by the plant either remain in the substrate system or are drained through the drain hole.

There is a desire to use water and nutrients as efficiently as possible during the growing process. This is both for cost and environmental reasons. In particular, the nutrients are expensive to obtain, while waste water containing such nutrients is difficult to dispose of due to environmental legislation. The desire to avoid such waste is matched by a desire to improve plant growth conditions, and thereby to increase the yield and quality of fruit obtained from plants in this manner.

The use of mineral wool itself provides significant benefits in this regard as compared to traditional soil-based growing methods, but there is an ongoing requirement to further improve these characteristics. In particular, there is a conflicting desire to both produce more and consume less in plant growth processes. That is, a greater yield from the plants is desired while at the same time reducing the amount of water and/or nutrients that are used. In practice, existing growing methods and/or substrates provide limitations on both these aspects.

Important qualities of plant growth systems in this context include their water retention, re-saturation and water/nutrient distribution. The water retention reflects the quantity of water that can be retained by the system while the water distribution reflects the location within the slab of the water and nutrients that are present. The re-saturation refers to the tendency of newly added liquid solution to add to the water and nutrient levels of the substrate rather than replace existing solution or be spilled.

Particular considerations which affect water retention, water distribution and re-saturation include the effect of gravity, which tends to force water downwards and thus towards the drain hole, and capillary effects which can cause water to be drawn upwards. In practice, the slabs are typically provided on a slight slope, with the drain hole located at the lowest end of the bottom surface, helping to ensure that gravity forces the water towards the drain hole. In addition to gravity and capillary effects, the flow resistance of the medium should be considered, which has the effect of preventing water passing through the slab from the drippers to the drain hole. Overall, if root and plant development is to optimised, then it is necessary to ensure that optimal conditions are found in the region of the substrate in which the roots are growing.

As would be expected, poor water retention leads to water being lost, and thus wasted, through the drain hole. The water distribution is also important since it is necessary for the water within the slab to reach the plant roots. For example, when a plant has recently been placed on the slab, the roots will extend only into the upper regions of the slab. Thus if the majority of water sinks to the bottom of the slab due to the effects of gravity, then the plant may not receive sufficient water and/or nutrients. In particular, in order to ensure that the plant roots in the top region of the slab are sufficiently watered, it may be necessary for the grower to provide excessive water to the slab so that the lower regions contain more water than is required, leading to greater wastage through the drain hole and extra costs. Excessive water levels can also increase the risk of fungal growth which may damage the plant.

An example of the difficulties that arise due to the imbalance in water concentration occurs as a result of seasonal variations. As summer turns into autumn, the days grow shorter and the amount of sunlight provided to the plant growth systems reduce. As a result, the level of evaporation of water from the system also reduces. It is desirable therefore to provide less water to the plant growth system as the requirement to replace evaporated water is reduced. However, since the water is tends to flow to the bottom of the slab a reduction in the water provided to the system risks drying out the top of the slab. To avoid this risk, unnecessary water is often provided, leading to waste. These conditions occur particularly in winter or early spring, and are often particularly acute when the plant/blocks are initially placed on the slabs. At this stage it is essential that the top of the slab is wet enough for the plant roots to begin growth within the slab but this can often lead to significant wastage of unused water and/or nutrients in the lower part of the slab, which can, for example, be lost through a drain hole.

Another factor in the plant growth is the retention and distribution of nutrients. Although the nutrients are typically introduced with the water, they will not necessarily be distributed and retained by the slab in the same way. The nutrients typically comprise dissolved salts comprising nitrogen, phosphorus, potassium, calcium, magnesium and similar elements. The nutrients are dissolved in the water and their movement through the slab is affected by processes such as advection, dispersion and diffusion. Advection is the movement of nutrients with the water flow through the slab, dispersion is the mixing of nutrients that occurs as they travel through complex pore structures in the slab, and diffusion relates to random movement of particles within the slab and the statistical tendency this has to reduce concentration gradients.

As with the water itself, it is important that the nutrients reach the plant roots. If nutrients are poorly distributed, or are lost from the slab, then excess nutrients may be required in the slab as a whole for the plant to receive the nutrients it requires. This is of course a waste of nutrients.

Another consideration that plays a role in plant growth on man made substrates is the nutrient refreshment efficiency. This relates to whether the introduction of new nutrient solution will flush out existing nutrients in the slab. In some circumstances, it may be desirable to change the nutrient concentration within the slab during the growth process. The ability to do this will depend on whether existing nutrients can effectively be replaced through the whole slab or at least the region of the slab in which root growth takes place. Moreover, in some examples a build up of nutrients if they are not replaced can reach levels which can cause dehydration or at least non-ideal for plant growth.

The problems identified above relate at least partly to the inherent properties of the slab. However, further difficulties and inconsistencies arise because of the action of the plants themselves. In particular, the plant root systems do not take water or nutrients from the slabs uniformly. This difficulty is particularly pronounced when multiple blocks are provided in each plant growth system. For instance, the different plants in the system are likely to develop differently and have different requirements. This increases the complexity in providing the correct water and nutrient content to each plant.

Efforts have been made to improve some of the aspects of plant growth systems mentioned above. For example, international patent application WO 2007/129202 describes a hydrophilic curable aqueous composition for use in a plant growth substrate wherein said curable aqueous composition is formed in a process comprising combining the following components: a hydroxy-containing polymer, a multi-functional crosslinking agent which is at least one selected from the group consisting of a polyacid, salt(s) thereof and an anhydride, and a hydrophilic modifier; wherein the ratio of (a):(b) is from 95:5 to about 35:65. The hydrophilic modifier can be a sugar alcohol, monosaccharide, disaccharide or oligosaccharide. Examples given include glycerol, sorbitol, glucose, fructose, sucrose, maltose, lactose, glucose syrup and fructose syrup. This composition is said to offer benefits over the use of phenol-formaldehyde resins as binders in mineral wool substrates by improving the hydrophilicity, and thus the water retention of the substrate. Examples of formaldehyde free binders are also described in international patent application WO 2008/028923 and European patent application EP1047645.

WO 2008/009467 is another document which describes a substrate said to offer superior water retention properties due to an improved binder system. In this document, an ionic surfactant is used as a wetting agent in the binder system. The advantages of this are said to be particularly effective in substrates having a height of at least 53 mm. Another known plant growth substrate is sold under the trade name "GroTop Master" by the Grodan division of Rockwool BV. This substrate supports multiple blocks upon a single slab, the slab typically having a height of 75 mm and comprising layers of differing density designed to improve the water distribution across the height of the slab.

Notwithstanding these efforts, there is an ongoing requirement to improve the distribution and retention of water and nutrients in the slab in order to allow greater performance efficiency and cost-effectiveness in plant growth methods and thereby to secure a more sustainable way of growing. Existing techniques often result in the loss and/or overfeeding of water and/or nutrients due to the difficulties in controlling the distribution and retention of a feed solution in the slab in such a way to satisfy the requirements of plant growth.

SUMMARY OF THE INVENTION

According to a first aspect of the present invention, there is provided a man-made vitreous fibre (MMVF) plant growth substrate comprising a coherent slab having the following properties:
(a) a total volume in the range 3 to 20 litres,
(b) a first layer of MMVF having a density in the range 40 to 90 kg/m$^3$,
(c) in interfacial contact with the first layer, a second layer of MMVF having a density in the range 35 to 85 kg$^3$ that is lower than the density of MMVF of first layer; and
(d) the MMVF of both layers is bonded by an organic binder selected from formaldehyde-free binders.

The present invention can provide a slab of a preferred overall volume which combines a formaldehyde-free binder with differing densities in first and second layers. It is found that this combination provides a marked improvement in the distribution and retention of water and nutrients in the slab. For example, it is preferred that, in use, the more dense first layer of MMVF is disposed above the second, less dense layer of MMVF. In combination with the dimensions of the slab and the formaldehyde-free binder, a significant improvement is achieved in the water retention in the upper layer, thereby helping to avoid circumstances in which the lower portion of the slab becomes waterlogged while the upper portion, in which the majority of plant roots are found, is too dry.

The benefits of this improved water distribution are particularly significant during an early stage when a plant-containing block is newly placed on the slab. At this point it is important that the first layer contains enough water and nutrients to secure a good rooting within the slab. This allows positive root development to secure optimal and healthy plant growth. Beneficially, not only does the slab of the present invention allow sufficient water and nutrients to be provided, but it also allows the level water and nutrients in the vicinity of the roots to be closely controlled. This can help to avoid circumstances in which the plant is provided with excessive water and/or nutrients, which can, for example, reduce the rate of growth of fruit and/or vegetables if the plant enters a vegetative, rather than generative, state.

The size of the slab also allows more effective control of water and nutrient levels compared to conventional, larger slabs. Unlike previous slabs, which are typically designed to receive multiple plant-containing blocks on an upper surface, the slab of the present invention is in preferred embodiments arranged for use with a single plant-containing block. In this way, the water and nutrients provided to an individual plant, or plants from an individual block, may be closely managed. The present invention can also avoid the inhomogeneity of the plant growth conditions that can occur between plants growing in different blocks, either because of the asymmetric growth and thus water/nutrient uptake by plants from different blocks or the inherent bias towards one end of the slab which occurs because the slabs are normally placed on a slight slope, with the drain hole located at the lowest point. The present invention thus allows the level of water and nutrients provided to plants to be optimised, in particular allowing irrigation strategies which steer the plant between generative and vegetative growth to be accurately deployed.

The man made vitreous fibres (MMVF) of the present invention may be fibre glass, mineral wool or refractory ceramic fibres. In preferred embodiments, the MMVF is mineral wool.

In preferred embodiments, the binder is comprised in a hydrophilic binding system. The binding system may comprise the binder and a wetting agent, or may comprise the binder alone. By ensuring that the binding system is hydrophilic, the water retention properties of the slab can be improved relative to binding systems which are non-hydrophilic or hydrophobic.

Preferably, the binder comprises the reaction product of a polycarboxylic acid component and a polyol and/or an amine component, preferably in admixture with a sugar component and/or a phenol. More preferably, the binder is a reaction product of a polycarboxylic acid or anhydride thereof, an amine, preferably an alkanolamine, and a sugar, preferably a reducing sugar. These binders are found to offer particularly advantageous properties in MMVF slabs.

The wetting agent can be a non-ionic surfactant but preferably comprises an ionic surfactant distributed in one or both said layers. Preferably, the surfactant is an anionic surfactant, preferably a sulphonate surfactant, preferably linear alkyl benzene sulphonate (LABS). These preferred wetting agents have been found to offer beneficial effects, particularly improving the hydrophilicity of the binder system.

At least one, and preferably both, of the layers extend across an entire plain of the slab. Thus, the layers may be of equal dimensions in the plane. However, the thickness of the layers may vary.

Preferably, said first layer has a thickness in the range of 25 mm to 50 mm, said second layer has a thickness in the range of 50 mm to 100 mm, and the total thickness of the slab is in the range 75 mm to 150 mm.

The density of the first layer is in the range 40 $kg/m^3$ to 90 $kg/m^3$ and preferably in the range 50 $kg/m^3$ to 85 $kg/m^3$. In a preferred embodiment, the density of the first layer is 70 $kg/m^3$. The density of the second layer is in the range 35 $kg/m^3$ to 80 $kg/m^3$ and preferably in the range 45 $kg/m^3$ to 75 $kg/m^3$. In a preferred embodiment, the density of the second layer is 50 $kg/m^3$. These densities are found to offer good properties for plant growth, including water and nutrient retention.

The density of the second layer is less than that of the first layer. Preferably, the density of the second layer is at least 5 $kg/m^3$ less than that of the first layer, more preferably at least 10 $kg/m^3$, and most preferably around 20 $kg/m^3$. This contrast between the densities of the layers assists in ensuring that water and nutrients are suitably distributed through the slab, and in particular can help to avoid an excessive proportion of water and/or nutrients being found in the second layer.

in preferred embodiments, the thickness of the first layer is less than the thickness of the second layer. In preferred embodiments, a ratio of first layer thickness to second layer thickness is in the range 1:(1-3), preferably 1:(1.2-2.5), more preferably 1:(1.2-1.8). For example, the thickness of the first layer may be half the thickness of the second layer or more. The preferred relative thicknesses of the first and second layers are found to offer close control of the water and nutrient retention throughout the substrate.

In preferred embodiments, the predominant fibre orientation of the first and second layers is horizontal. In this context, horizontal means parallel to the interfacial contact between the first and second layers. In other preferred embodiments, the predominant fibre orientation of one or both of the first and second layers is vertical (i.e. perpendicular to the interfacial contact). For example, in a particularly preferred embodiment, the predominant fibre orientation of the first layer is vertical while the predominant fibre orientation of the second layer is horizontal. In an alternative embodiment, the predominant fibre orientation of the first layer may be horizontal while the predominant fibre orientation of the second layer is vertical. The fibre orientations can affect the flow speed of liquid through the slab. For example, horizontal fibre orientations can reduce the flow speed of liquid through the slab and have a consequent beneficial effect on the amount of liquid that is spilled.

In preferred embodiments, the substrate further comprises a liquid impermeable covering surrounding the two layers. The liquid impermeable covering may have one or more openings. Preferably, a first opening is disposed on a first face of the slab adjacent to the first layer and is provided for engagement of the first layer with a plant-containing MMVF block. In preferred embodiments, there is one and only one opening disposed adjacent to the first layer. Accordingly, only a single MMVF block is used in combination with the substrate. This allows closer control of plant growth conditions than is possible when multiple blocks are used with a single substrate.

A second opening is preferably provided on a second face of the slab adjacent to the second layer. The second opening may be provided as a drain hole to remove unwanted or excess liquid from the slab. The second face of the slab may be an opposite face to the first face. The liquid impermeable covering ensures that the liquid content of the slab is contained, while the openings allow liquid to be provided and drained as required.

The first opening is preferably an opening in a major surface of the slab. Moreover, the opening is preferably (50-250)×(50-250) mm in size. The size of the opening is chosen according to the size of the block it is intended to accommodate. The opening may be formed in any appropriate manner, such as by a u-shaped cut through the liquid impermeable covering leaving hinged flap.

According to a second aspect of the present invention, there is provided a plant growth system, comprising the substrate of any one of the preceding claims, and a single plant-containing man made vitreous fibre block in contact with the first layer. The system comprises one and only one plant-containing block, thereby enabling the plant growth conditions of individual plants to be accurately controlled.

BRIEF DESCRIPTION OF THE DRAWINGS

Preferred embodiments of the present invention will now be described with reference to the accompanying drawings, in which.

DETAILED DESCRIPTION

Figure 1:
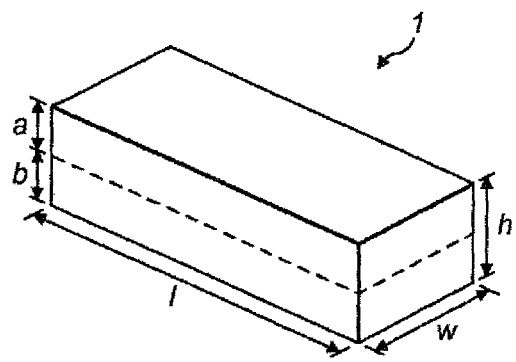
FIG. 1 illustrates a slab used for plant growth in accordance with a preferred embodiment of the present invention.

Referring to FIG. 1, there is shown a mineral wool slab 1 having a first layer of a first density disposed above a second layer of a second density. The slab 1 has a volume of 6.8 litres, although more generally the volume may be in the range of 3 litres to 20 litres, more preferably in the range 5 litres to 15 litres, and most preferably in the range 5 to 11 litres. Some embodiments comprise a slab with a volume in the range 6 litres to 8 litres. In other embodiments, the volume may lie in the range of 3 litres to 15 litres, or 3 litres to 10 litres, for example. An alternative preferred embodiment comprises a slab having a volume of 9 litres.

The height h of the slab 1 of FIG. 1 is 100 mm, although more generally it may lie between 75 mm to 150 mm and more preferably between 85 mm and 125 mm. The width w of the slab 1 is 150 mm, although this may more generally lie in the range of 100 mm to 300 mm, for example. The length l of the slab 1 is 450 mm, although this value may also be varied, and may, for example, lie in the range of 200 mm to 800 mm, or preferably in the range 250 mm to 600 mm. A particular preferred embodiment comprises a slab 1 having a height h of 100 mm, a width w of 150 mm and a length l of 600 mm.

In the preferred embodiment shown in FIG. 1, the first layer has a height a of 40 mm and a density of 70 kg/m$^3$ while the second layer has a height b of 60 mm and a density of 50 kg/m$^3$. Again, in other preferred embodiments different values of these parameters may be chosen. For example, the height a of the first layer may lie in the range of 25 mm to 50 mm, while the height of the bottom layer may lie in the range of 50 mm to 100 mm. Similarly, the density of the top layer is preferably in the range of 40 kg/m$^3$ to 90 kg/m$^3$, more preferably 50 kg/m$^3$ to 80 kg/m$^3$, while the density of the bottom layer is preferably in the range of 35 kg/m$^3$ to 85 kg/m$^3$, more preferably 45 kg/m$^3$ to 75 kg/m$^3$.

As is the case in the embodiment shown in FIG. 1, it is preferable that the height of the bottom layer is greater than that of the top layer. For example, the ratios between the heights of the top and bottom layers may be 1:(1-3), or preferably 1:(1.2-2.5). More preferably, this ratio is 1:0.2-1.4

The use of two differing densities in the slab of the preferred embodiment, together with its relatively small size, have been found to assist in the retention of water and nutrients and also ensuring that these are distributed substantially uniformly throughout the slab.

This can be seen, for example, in Table 1 below. Table 1 illustrates the response of various slabs having dimensions of 450 mm*150 mm*100 mm and comprising two layers of differing density as described above. The slab 1 of Column A has a top layer of height 30 mm and a bottom layer of height 70 mm; the slab 1 of Column B has a top layer of height 40 mm and a bottom layer of height 60 mm; and the slab 1 of Column C has top and bottom layers both of height 50 mm.

TABLE 1

|  | Column A | Column B | Column C |
| --- | --- | --- | --- |
| Resaturation (%) (start = 60%) | 70 | 69 | 73 |
| Uniformity WC within (%) | 13 | 9 | 8 |

TABLE 1-continued

| | Column A | Column B | Column C |
|---|---|---|---|
| Reaction time EC | 5.0 -> 3.2 -> 2.5 -> 2.1 | 5.0 -> 2.9 -> 2.7 -> 2.1 | 5.0 -> 3.3 -> 2.7 -> 2.3 |
| Irrigation efficiency (%) | 100 | 100 | 100 |

Various properties of each slab were analysed, including uniformity of water content (uniformity WC level) and the reaction when a change of EC was introduced (reaction time EC). It was found that the slabs of Columns A and B demonstrated improved EC reaction time, while WC uniformity was observed to be improved for the slabs of Columns B and C. Given the desirability of close control of nutrient content (i.e. improved EC reaction time) and uniform WC, the slab of Column B was considered optimum of the examples shown. The ratio between the heights of the top and bottom layers of 1:1.5 exhibited by this slab falls within the preferred range of 1:(1.2-1.8).

Reaction time EC in Table 1 is measured as follows. Firstly, the slabs are saturated at 60% water content with an EC of 5. Subsequently, the slabs are irrigated in turns with 264 ml of EC2 solution per turn on the slab. The EC within the slab is measured after 0, 9, 17 and 32 turns. Accordingly, in the case of Column A, for example, the results are as follows: 0 turns applied—EC 5; 9 turns applied—EC 3.2; 17 turns applied—EC 2.5; and 32 turns applied—EC 2.1.

Figure 2:
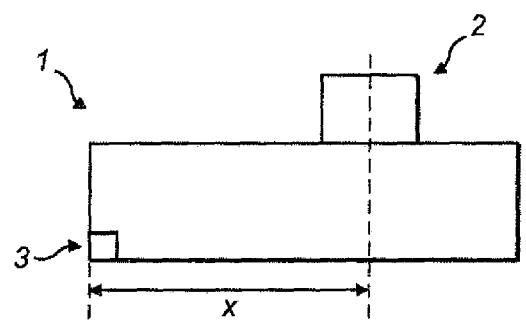
FIG. 2 illustrates a plant growth system comprising a block together with the slab of FIG. 1.

Referring now to FIG. 2, the slab 1 is shown with a block 2 positioned on its upper surface. The slab 1 further comprises a liquid impermeable covering around the mineral wool, the covering having two openings. Firstly, there is an opening on the upper surface to allow contact between the mineral wool of the slab 1 and the block 2. Secondly, there is an opening on a lower surface which acts as a drain hole 3.

As can be seen in FIG. 2, the slab 1 is associated with only a single block 2 for containing plants. In this way, the environment of the plant or plants in a single block 2 can be directly managed more effectively. This contrasts with previous systems in which a plurality of blocks 2 is provided on each slab 1. In particular, this avoids interference between plants from different blocks 2 and consequent inconsistency in water or nutrient supplies to such plants.

Whereas the block 2 is provided on an upper surface of the slab 1, the drain hole 3 is provided at or adjacent to an edge of a lower surface of the slab 1. The position of the block 2 as measured from its central point is preferably offset from that of the drain hole 3 by a distance x along the lengthy of the slab 1. The distance x is preferably greater than 50% of the length l of the slab 1, more preferably greater than 60% of this length, and may be greater than 70% of this length, although most preferably it is between 65% and 70%. In the particular preferred embodiment shown in FIG. 2, the block 2 is offset from the position of the drain hole 3 by around 66.7% of the length of the slab. Specifically, the length l of the slab 1 is 450 mm, while the block 2 is placed at a distance of 300 mm from the end of the slab 1 on which the drain hole 3 is disposed. By increasing the distance between the block 2 and the drain hole 3, the path length of solution comprising water and nutrients provided to or adjacent to the block is increased. This is found to provide benefits in terms of the nutrient refreshment efficiency of the slab 1.

The block 2 and the slab 1 are preferably formed of the same or a similar material. Thus the description below regarding the material of the slab 1 may equally be applied to the block 2. In particular, the block 2 may comprise stone wool and the binders and/or wetting agents described below. In the preferred embodiment, the block 2 has a volume of 1200 ml. More generally the block may have a volume in the range of 50 ml to 5000 ml, more preferably 100 ml to 3500 ml, more preferably 250 ml to 2500 ml, and most preferably 100 ml to 2000 ml. The overall volume of the combination of the slab 1 and block 2 is preferably in the range of 6 to 13 litres.

The block dimensions can be chosen in dependent on the plant to be grown. For example, the preferred length and width of a block for pepper or cucumber plants is 10 cm. For tomato plants, the length is increased to 15 cm. The height of the blocks is preferably in the range of 7 to 12 cm, and more preferably in the range of 8 to 10 cm.

Therefore, preferred dimensions for pepper and cucumber range from 10 cm*10 cm*7 cm to 10 cm*10 cm*12 cm, and more preferably from 10 cm*10 cm*8 cm to 10 cm*10 cm*10 cm. In terms of volume, therefore, the preferred range is 0.7 litres to 1.2 litres, more preferably 0.8 litres to 1 litre for cucumber and pepper plants. For tomato plants, the preferred dimensions range from 10 cm*15 cm*7 cm to 10 cm*15 cm*12 cm, and more preferably from 10 cm*15 cm*8 cm to 10 cm*15 cm*10 cm. In terms of volume, therefore, the preferred range is 1.05 litres to 1.8 litres, more preferably 1.2 litres to 1.5 litres for tomato plants. The overall range of volumes for these crops is therefore preferably 0.7 litres to 1.8 litres, and more preferably 0.8 litres to 1.5 litres.

The density of the block 2 is preferably in the range of 30 kg/m$^3$ to 150 kg/m$^3$, more preferably in the range of 40 kg/m$^3$ to 120 kg/m$^3$, and most preferably in the range of 50 kg/m$^3$ to 100 kg/m$^3$. The height of a block 2 is preferably in the range 50 mm to 160 mm, more preferably in the range 60 mm to 125 mm and most preferably in the range 80 mm to 100 mm. The length and width of the block 2 may independently vary in the range 50 mm to 250 mm, preferably in the range 60 mm to 200 mm, and most preferably in the range 70 mm to 150 mm. These sizes and densities have been found to be effective for use in plant growth systems.

Figure 3:
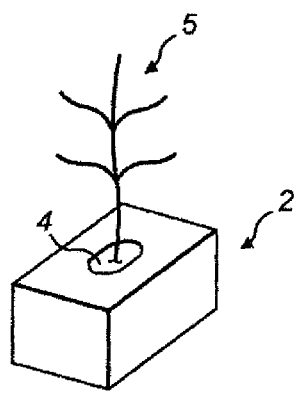
FIG. 3 illustrates the block of FIG. 2 together with a plug and a plant.

FIG. 3 illustrates a plant 5 in position within a plug 4 disposed within a block 2, such as that shown in FIG. 2. Like the block 2, the plug 4 is typically formed of a mineral wool with a binder and/or wetting agent as described below in the context of the slab 1. The plug 4 is preferably cylindrical with a diameter of 20 mm to 50 mm, preferably 20 mm to 40 mm, and a height of 20 mm to 50 mm, preferably 25 mm to 35 mm.

Each block 2 may in a preferred embodiment contain a single plant 5. However, it is possible that multiple plants 5 may be provided for each block 2, either by providing multiple plugs 4 each containing a single plant 5 or providing multiple plants in a single plug 4. In other preferred embodiments, a single plant is divided into two by splitting the stem of the plant at an early stage of growth.

In some embodiments, the plug 4 is not provided, and the seed is disposed directly within a hole in the block, from which the plant 5 subsequently grows. An example of a plant for which this approach is taken is the cucumber.

Preferably, the plant 5 is fruit or vegetable plant, such as a tomato plant or the like. In other preferred embodiments, the plant is a cucumber, aubergine or sweet pepper plant. The preferred embodiments of the present invention can increase the yield of fruit or vegetables from a plant and may also increase the quality of that fruit or vegetable.

As mentioned above, the slab 1 is a mineral wool slab. The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

The mineral wool is typically bound by a binding system which comprises a binder composition and additionally a wetting agent. In the preferred embodiment, the slab comprises mineral wool bound by a binder composition which, prior to curing, comprises: a) a sugar component, and b) a reaction product of a polycarboxylic acid component and an alkanolamine component, wherein the binder composition prior to curing contains at least 42% by weight of the sugar component based on the total weight (dry matter) of the binder components.

This composition is included in the mineral wool which is to be used for the slab 1 and then cured, so that in the slab shown in FIG. 1 the composition has been cured and so the components will have reacted. Thus the slab contains a cured binder obtained by curing of the defined binder composition containing components (a) and (b) and the components of the binder composition discussed below refer to the composition prior to curing.

The sugar component (a) employed in accordance with the present invention is preferably selected from sucrose and reducing sugars or mixtures thereof.

A reducing sugar is any sugar that, in solution, has an aldehyde or a ketone group which allows the sugar to act as a reducing agent. In accordance with the present invention, reducing sugars may be present in the uncured binder composition as such or as a carbohydrate compound that yields one or more reducing sugars in situ under thermal curing conditions. The sugar or carbohydrate compound may be monosaccharide in its aldose or ketose form, a disaccharide, a triose, a tetrose, a pentose, a hexose, or a heptose; or a di-, oligo- or polysaccharide; or combinations thereof. Specific examples are glucose (i.e. dextrose), starch hydrolysates such as corn syrup, arabinose, xylose, ribose, galactose, mannose, frustose, maltose, lactose and invert sugar.

Component (b) essentially comprises a reaction product of a polycarboxylic acid component and an alkanolamine component.

Preferably the alkanolamine component is selected from diethanolamine, triethanolamine, diisopropanolamine, triisopropanolamine, methyldiethanolamine, ethyldiethanolamine, n-butyldiethanolamine, methyldiisopropanolamine, ethyl-isopropanolamine, ethyldiisopropanolamine, 3-amino-1,2-propanediol, 2-amino-1,3-propanediol and tris(hydroxymethyl)aminomethane. Most preferably the alkanolamine component is diethanolamine.

In the binder composition which is used in the products of the invention it is preferred to have the reaction product (b). However, in practice there is usually also some unreacted alkanolamine component present in the uncured binder composition.

The polycarboxylic acid component is generally selected from dicarboxylic, tricarboxylic, tetracarboxylic, pentacarboxylic, and like polycarboxylic acids, and anhydrides, salts and combinations thereof.

Preferred polycarboxylic acid components employed as starting materials for reacting with the other binder components are carboxylic anhydrides.

In the binder composition which is used in the products of the invention it is preferred to have the reaction product (b). However, in practice there is usually also some unreacted polycarboxylic acid component present in the uncured binder composition.

In order to improve the water solubility and dilutability of the binder, a base may be added up to a pH of about 8, preferably a pH of between about 5-8, and more preferably a pH of about 6. Furthermore, the addition of a base will cause at least partial neutralisation of unreacted acids and a concomitant reduction of corrosiveness. Normally, the base will be added in an amount sufficient to achieve the desired water solubility or dilutability. The base is preferably selected from volatile bases which will evaporate at or below curing temperature and hence will not influence curing. Specific examples of suitable bases are ammonia ($NH_3$) and organic amines such as diethanolamine (DEA) and triethanolamine (TEA). The base is preferably added to the reaction mixture after the reaction between the alkanolamine and the carboxylic anhydride has been active stopped by adding water.

An alternative binder composition may be based on a furan resin. Such a furanic binder composition is described in European patent EP0849987. The furanic binder composition is both formaldehyde-free and hydrophilic, thereby offering particular advantages in the context of the present invention.

Although preferred embodiments of the invention use a formaldehyde-free binder, binder systems comprising phenol-formaldehyde (PF), or particularly phenol-urea-formaldehyde (PUF), with or without dextrose may also be used where appropriate. These may include Ultra Low Formaldehyde (ULF) binders.

As mentioned above, the binding system preferably comprises a wetting agent. This can be a non-ionic surfactant but preferably the wetting agent is an ionic surfactant. By using the binder described above, the wetting agent is not essential to provide a hydrophilic binder system. Accordingly, adequate water retention and re-saturation properties may be achieved without the wetting agent. However, the use of a wetting agent is preferred as it is found to increase the speed at which the slab may become saturated.

Preferably, the wetting agent is an anionic surfactant. Suitable anionic surfactants include salts (including, for example, sodium, potassium, ammonium and substituted ammonium salts such as mono-, di- and triethanolamine salts) of the anionic sulphate, sulphonate, carboxylate and sarcosinate surfactants. Other anionic surfactants include isethionates such as the acyl isethionates, N-acyl taurates, fatty acid amines of methyl tauride, alkyl succinates and sulfosuccinates, mono esters of sulfosuccinates, di-esters of sulfosuccinates and N-acyl sarcosinates. Preferred are anionic sulphate surfactants and anionic sulphonate surfactants, anionic carboxylate surfactants and anionic soap surfactants.

Particularly preferred are the anionic sulphonate surfactants such as linear or branched alkyl benzene sulphonates, alkyl ester sulphonates, primary or secondary alkylene sulphonates, olefin sulphonates, sulphonated polycarboxylic acids, alkyl glycerol sulphonates, fatty acyl glycerol sulphonates, fatty oleyl glycerol sulphonates and mixtures thereof.

Most preferably the anionic surfactant is a linear alkyl benzene sulphonate in which the alkyl chain has from 5 to 20 carbon atoms. The sodium and potassium salts are preferred. This type of surfactant provides particularly beneficial water distribution properties for growth substrates of relatively large height and also provides excellent re-saturation properties and does not lead to foaming problems in the irrigation water. Conventional non-ionic surfactants allow the growth substrate to take up water, but their water retaining capacity, water distribution over height and re-wetting properties are not as good as with this type of surfactant, preferred in the invention.

Preferably the alkyl chain length is in the range 8 to 16, and more preferably at least 90% of the chains are in the range 10 to 13 and more preferably at least 90% (by weight) are in the range 10 to 12.

Preferably the wetting agent comprises a linear alkyl benzene sulphonate and in this case the product is preferably produced by a method in which a polyol (such as monoethylene glycol) is included with the wetting agent in the mineral fibre product. The weight ratio of linear alkyl benzene sulphonate to monoethylene glycol (or other polyol—for instance propylene glycol or trimethylolpropane) is preferably 0.3:1 to 3.75:1, preferably 1:1 to 2:1. The polyol is normally evaporated during subsequent processing and curing and thus usually only trace amounts, if any, are present in the final product.

Alternatively, the ionic surfactant may be cationic or zwitterionic. Examples of cationic surfactants include quaternary ammonium surfactants. These can, for instance, be selected from mono C6 to mono C16, preferably C6 to C10 N-alkyl or alkenyl ammonium surfactants wherein the remaining N positions are substituted by groups such as methyl, hydroxyethyl and hydroxypropyl.

Suitable zwitterionic surfactants include derivatives of secondary and tertiary amines, derivatives of heterocyclic secondary and tertiary amines, or derivatives of quaternary ammonium, quaternary phosphonium or tertiary sulphonium compounds. Betaine and sultaine surfactants are examples of zwitterionic surfactants.

Preferably the amount (by weight) of ionic surfactant based on the weight of binder (dry matter) is in the range 0.01 to 5%, preferably 0.1 to 4%.

The ionic surfactant is present in the mineral fibre product in amounts preferably from 0.01 to 3% (by weight), based on mineral fibre product, more preferably 0.05 to 1%, in particular, 0.1 to 0.8%.

The binder compositions used according to the present invention may additionally comprise one or more conventional binder additives. These include, for instance, curing accelerators such as, e.g. β-hydroxyalkylamides; the free acid and salt forms of phosphoric acid, hypophosphorous acid and phosphonic acid. Other strong acids such as boric acid, sulphuric acid, nitric acid and p-toluenesulphonic acid may also be used, either alone or in combination with the just-mentioned acids, in particular with phosphoric acid, hypophosphorous acid or phosphonic acid. Other suitable binder additives are ammonia; silane coupling agents such as γ-aminopropyltriethoxysilane; thermal stabilisers; UV stabilisers; plasticisers; anti-migration aids; coalescents; fillers and extenders such as clay, silicates and magnesium hydroxide; pigments such as titanium dioxide; flame retardants; corrosion inhibitors such as thiourea, urea; antifoaming agents; antioxidants; and others.

These binder additives and adjuvants may be used in conventional amounts generally not exceeding 20 wt. % of the binder solids. The amount of curing accelerator in the binder composition is generally between 0.05 and 5 wt. %, based on solids.

Once applied to the mineral fibres, the aqueous binder composition generally has a solids content of from 1 to 20 wt. % and a pH of 5 or greater.

The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

The Loss on Ignition (LOI) of the slab is a measure of the amount of organic material such as binder and wetting agent present. The LOI of a dry sample may be measured using section 16 of BS2972, 1989 (Method 1). The LOI is preferably at least 2.5%, preferably up to 5.3%, especially preferably 3-4%. In particular, the most preferred LOI is 3.5%. The preferred LOI for the slab offers good strength, but with the binder described above plant growth is not negatively affected despite the higher level of binder.

A higher LOI means the product is stronger. This means it is less likely to be damaged during use, especially during automated processing, for instance at a propagation facility. A further advantage of a higher binder content is that a smoother seed bed/hole can be formed in growth substrates such as plugs and blocks that are commonly provided with a seed hole. A smoother seed hole means that the seed is more likely to propagate from the ideal position in the seed bed/hole. The seed is additionally less likely to bounce out of the desired area, and/or be caught another part of the mineral fibre product. Accurate positioning of seeds leads to greater uniformity of the resulting crop which is advantageous for the propagator.

The diameter of the fibres within the slab 1 is preferably in the range of 2 to 10 µm, more preferably in the range of 3 to 8 µm, and particularly preferably in the range of 4 to 7 µm. These values may apply equally to the diameter of the fibres in the block 2 and/or plug 4.

In the preferred embodiment, the predominant fibre orientation of the first and second layers of the slab 1 is horizontal. This is found to reduce vertical non-uniformity in the water distribution. In this context, horizontal means parallel to the interfacial contact between the first and second layers. Alternative fibre orientations may be used in the first and/or second layers in other embodiments.

Figure 4:
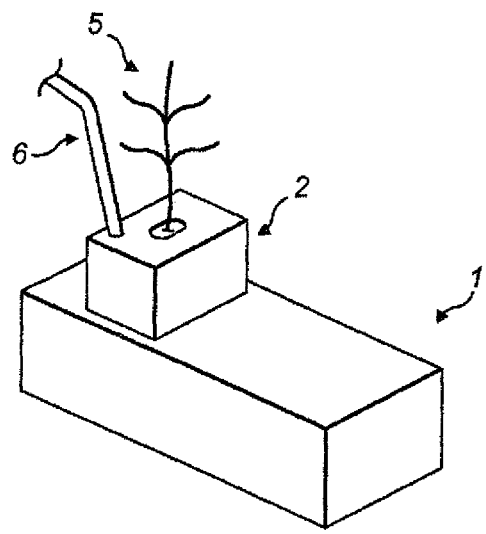
FIG. 4 illustrates an irrigation device in place next to the plant growth system of FIG. 2.

FIG. 4 shows a plant growth system comprising the slab 1, block 2 and plug 4 of FIGS. 1 to 3 and an irrigation device. The irrigation device 6 is arranged to provide a solution of water and nutrients to the system, either directly to the block or to the slab. In the preferred embodiment, the irrigation device is arranged to provide water and/or nutrient solution directly to the block 2. Since the block is disposed away from the drain hole 3 (as described above with reference to FIG. 2), solution from the irrigation device must pass more than 50% of the distance along the slab 1 before reaching the drain hole 3. In other preferred embodiments, the irrigation device may provide the water and nutrient solution to the slab 1 directly, but it is preferably arranged to do so either adjacent to the block or at a distal side of the block 2 relative to the drain hole 3.

It is found that an increased distance between the irrigation device 6 (i.e. the point at which the water and nutrient solution is provided to the system) and the drain hole 3 improves the nutrient refreshment efficiency of the system. This means that as solution is supplied using the irrigation device 6 it is not lost through the drain hole 3 but instead will replace existing liquid in the system. Accordingly, the total volume of the slab 1 is refreshed, rather than only a limited part of it.

The irrigation device 6 may be connected to separate nutrient and water reservoirs, and may be controlled to select the appropriate proportions of nutrients and water. Alternatively, a single combined nutrient and water reservoir may be provided such that the irrigation device provides liquid to the system having the same proportions of water and nutrients as are found in the reservoir.

Figure 5:
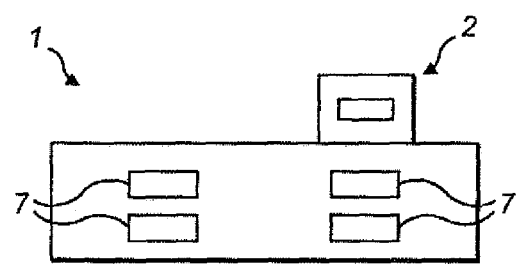
FIG. 5 illustrates the location of water and nutrient detectors on the plant growth system of FIG. 2.

The control of the irrigation device is preferably effected using a control system. The control system may control the irrigation devices providing nutrients and water to a plurality of plant growth systems each comprising a slab 1 upon which a plant-containing block 2 is placed. The control system may be controlled on the basis of detected water, nutrient and/or temperature levels in one or more of the slabs. The locations of the detectors 7 used to detect these levels in one embodiment are illustrated in FIG. 5. The detectors 7 may be of a known type, and will typically comprise a body portion together with one or more, usually three probes which extend from the body into the slab. The probes are typically made from stainless steel or another conductive material, and are used to measure the water content and/or electrical conductivity (EC) levels of the substrate by analysing the substrate's temperature, resistance and/or capacitance. The EC level can be used to infer the nutrient level within the solution in the slab 1 as they reflect the ionic content of that solution.

In prior art systems, the detectors 7 are placed on the upper surface of the slab 1, with the probes extending vertically through the slab. This approach is intended to provide a measurement which reflects the overall water or nutrient content across the vertical extent of the slab 1. However, in practice, such probes typically return results which are disproportionally influenced by the conditions in one or more areas of the slab 1, such as in the top portion of the slab. One reason this disparity can arise is because of variation in the EC level across the slab 1, which clearly affects the measured electrical properties such as resistance and/or capacitance from which, for example, the water content is calculated.

Further difficulties arise in prior art approaches due to the number of blocks 2 usually placed on a slab 1. It is often difficult to find positions on the slab 1 which are functionally equivalent for each block 2, particularly given the inherent asymmetry in the system caused by the location of the drain hole 3 at one end of the slab 1.

In the present invention, these difficulties are overcome. In particular, FIG. 5 shows that the detectors 7 are disposed on the side of the slab 1 (i.e. the body portion of the detector 7 is disposed against a vertical face of the slab and the probes extend horizontally). This approach is available because of the improved water content and EC distributions within the slab 1. Since these are substantially uniform in the slab 1 of the preferred embodiment, the horizontal extent of the probes provides an accurate reading.

Indeed, while the slab 1 of FIG. 5 is illustrated with a plurality of detectors 7, this is not the case in all preferred embodiments. The array of detectors 7 shown in FIG. 5 allows measurement of the water content distribution and EC distribution, and has been used to analyse the slab 1 characteristics, providing results such as those detailed below. However, in practice it is found that only a single detector 7 may be required. This detector 7 preferably comprises horizontally extending probes located at a position offset from the block towards the drain hole 3. In particular, in a preferred embodiment, the detector 7 is located at a distance of 200 mm from the drain hole 3 and 100 mm from the block 2. The positions of the block 2 and the detector 7 in this context are measured from their central points.

Figure 6:
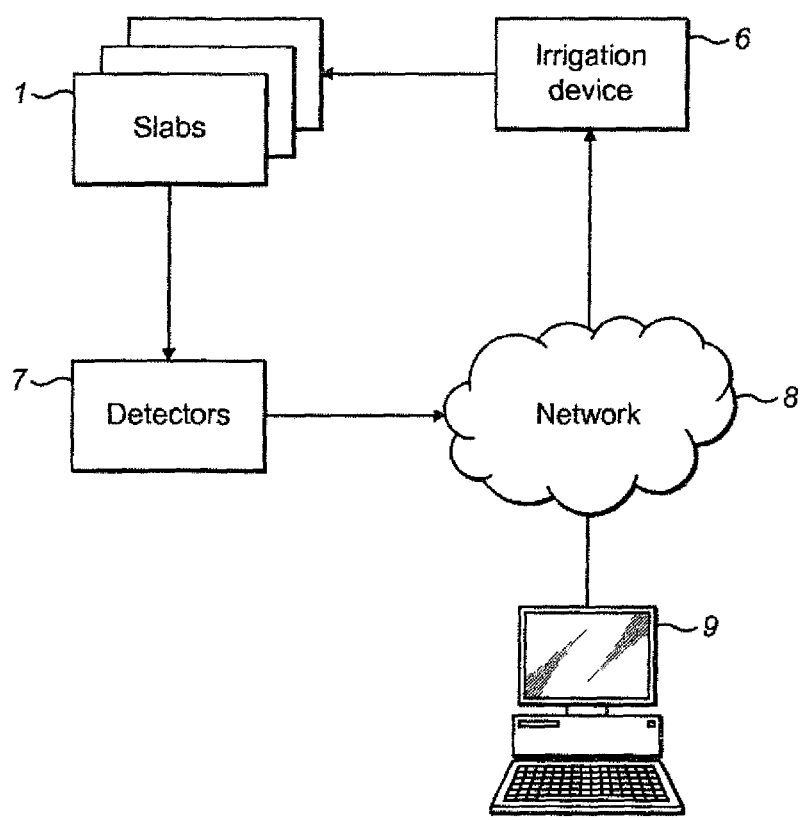
FIG. 6 shows schematically a plant growth control system comprises a plurality of the plant growth systems of FIG. 2.

The detectors 7 are used to control the level of water and/or nutrients provided to the slab 1 by using a control system such as that illustrated in FIG. 6. As can be seen from this Figure, the detectors 7 observe the data in the slabs 1, and communicate this across a network 8 to a control unit 9. The control unit then drives the irrigation devices (drippers) 6 across the network 8 in order to provide water and nutrients to the slabs 1. The control unit 9 can be programmed with a desired irrigation strategy (as discussed in more detail below) and can automatically ensure that the irrigation is carried out to meet desired water levels or nutrient levels in the slab 1. In this way, an automatic control of the irrigation process to provide a desired result is achieved.

Typically, each control system will comprise a large number of slabs 1. There may be detectors 7 placed on every slab 1, or there may be detectors placed on a selection of the slabs 1 to provide representative results. The detectors 1 are fixedly mounted to the slabs 1, in order that they can provide results to the control unit 9 at regular intervals. For example, the detectors may provide results at intervals of one minute, five minutes or another suitable time period. This allows the slabs 1 within the system to be constantly monitored so that they can be irrigated appropriately.

The irrigation devices 6 of the system are controlled to apply a specific irrigation strategy. This strategy comprises a number of distinct phases, designed to steer plants through generative and vegetative growth. As is understood in the art, generative growth refers to a type of growth in which the production of flowers/fruit is encouraged, while during vegetative growth the plant a higher proportion of leaves and other green elements are produced. Generative growth is encouraged when a plant has a relative lack of water and/or nutrients, while vegetative growth is encouraged by a plentiful supply of water and/or nutrients. Vegetative growth produces the higher increase in overall biomass of the plant, while generative growth increases the proportion of the growth which contributes to the production of fruit or flowers.

Figure 7A:
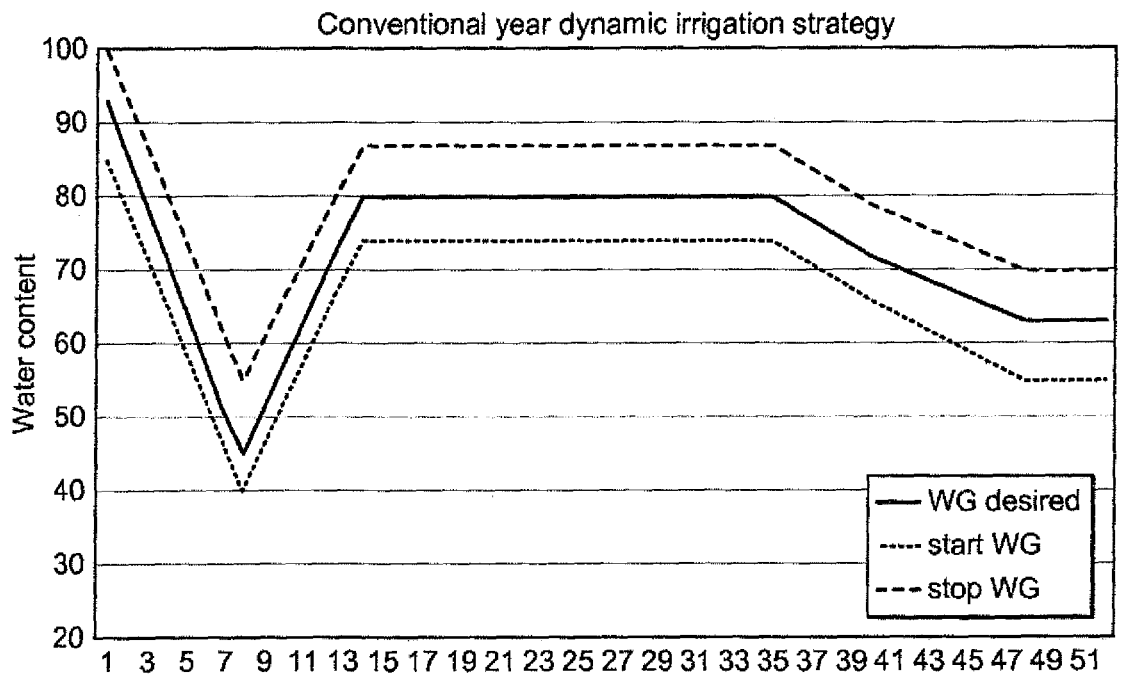
FIG. 7A illustrates the progression of a desired water level in the slab in a conventional irrigation strategy.

It has been known to take advantage of these different growth types by applying irrigation strategies such as those shown in FIG. 7A. According to the irrigation strategy, the plant growth substrate is watered each day in an attempt to reach a desired water content level. The water content of the substrate is measured as a percentage of the water content of the substrate when the substrate is fully saturated. Thus, a value of 0% represents a dry substrate, while a value of 100% represents a fully saturated substrate.

FIG. 7A shows the progression of this desired water content of the substrate over a year-long cycle. The y-axis shows Water Content as a percentage of the saturated level, while the x-axis shows time measured in weeks. This time is measured from the point at which the block 2 is placed on the slab 1. As well as the desired water content, FIG. 7A also shows the typical range of achieved water content in the substrates. This range is relatively wide due to the poor control of substrate conditions available using prior art systems.

Firstly, prior to placing the block 2 on the slab 1, the slab 1 is typically saturated or near-saturated with water. This helps to ensure that when the block 2 is first placed on the slab 1, root growth into the slab 1 is encouraged. At this point, however, the grower is anxious to ensure that the plant 5 provides fruit as soon as possible. In order to achieve this, the grower aims to impart a "generative impulse" (i.e. an impulse to initiate generative growth). This is done during a first period of the irrigation strategy, by reducing the desired water content down to a minimum level before increasing it again. The principle is that the reduction of water content will encourage generative growth of the plant and thus the flowering of the plant leading to fruit at the earliest available time.

So, from FIG. 7A it can be seen that during the generative impulse in this prior art irrigation strategy, the desired water content level of the substrate drops from around 95% down to 45%. This significant drop is in part necessary because of the wide range of achieved water content, which can be seen in that even after the drop to 45% for the desired water content, the achieved range extends from around 40% up to around 55%. Thus, it was considered necessary in order to achieve the required generative impulse for all plants that the irrigation strategy should comprise a reduction of desired water content of the magnitude shown in FIG. 7A.

After the generative impulse is applied, the grower wishes to return the plant to a sustainable phase of predominantly vegetative growth in order to obtain leaves and plant structure which will support the now growing fruit. Thus, towards the end of the first period of the irrigation strategy, the desired water content is increased. The desired water content level is increased until it reaches a sustainable value at which it is held substantially constant during a second period of the irrigation strategy.

In the second period, more vegetative growth is encouraged due to the higher water content in the substrate. The constant level is chosen as around 80% in order to ensure the correct bias towards vegetative growth.

The second period corresponds broadly to the summer season, during which the relatively high amount of sunshine causes the plants to transpire at a greater rate. Accordingly, a relatively high proportion of water must be provided to the plants. It should be recognised that although growth may be steered towards vegetative growth during this period more than at other periods, fruit continues to grow, although the rate is controlled by this steering. As the season turns to autumn and then winter, the transpiration rate reduces. As a result, it is no longer necessary to maintain the same water content in the substrate. Moreover, there is at this stage a desire to encourage further fruit growth before the plant reaches the end of the cycle. For both these reasons, the irrigation strategy may comprise a third period in which the water content level is reduced. The rate of reduction is relatively gradual.

The reduction in water content during the third period encourages generative growth in the plant, and thereby extends the season during which useful fruit can be obtained from the plant.

So, the conventional irrigation strategy of FIG. 7A attempts to steer the plant between generative and vegetative growth states in order to increase the yield of fruit obtained from the plant. However, this steering is found only to be of limited practical effect or utility. Moreover, there is difficulty transferring between the different water content levels in the time period which would be preferred. For example, increasing the water content level from the minimum level during the first period to the constant level of the second period is time consuming. If it were attempted to increase this level more quickly by providing more water then it is found that the level of water spilled from the plant is excessive and problematic. Moreover, because of the broad range of achieved water content levels, there is difficulty in accurately steering the plant to the preferred level of generative or vegetative growth.

Figure 7B:
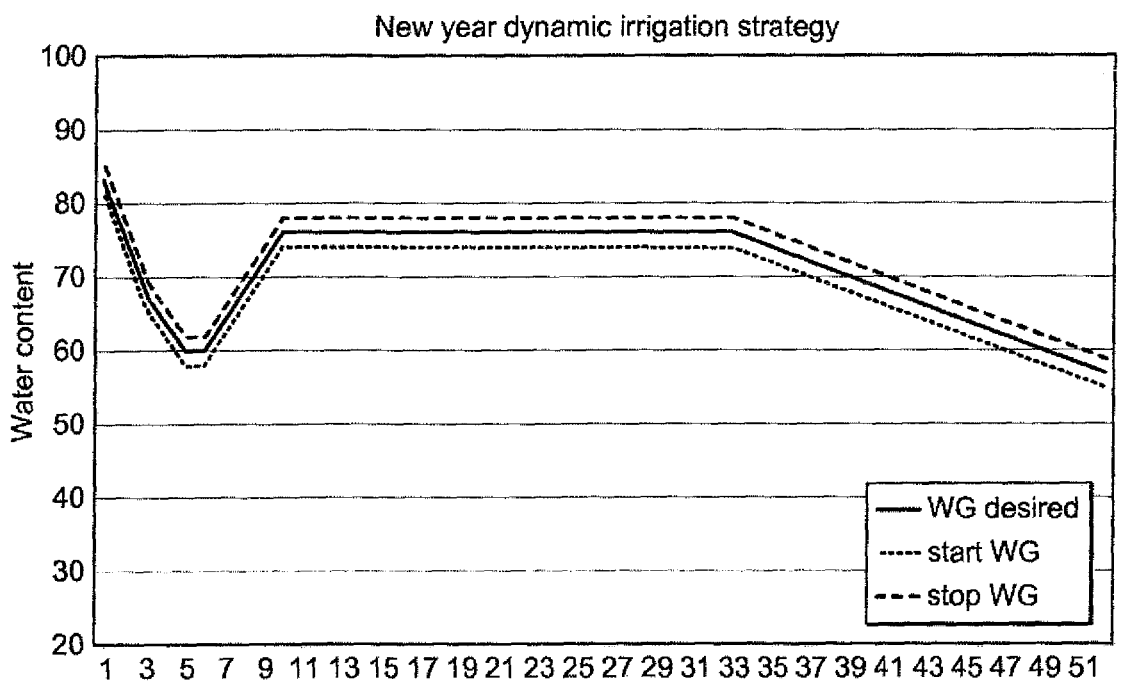
FIG. 7B illustrates the progression of a desired water level in the slab in an irrigation strategy in accordance with a preferred embodiment of the present invention.

In contrast, an irrigation strategy for use in accordance with a preferred embodiment of the present invention is shown in FIG. 7B. It has surprisingly been found that in the context of a plant growth substrate comprising a slab and only a single block, as described above, the parameters of the irrigation strategy can be greatly changed while still achieving the necessary generative and vegetative effects. As will be demonstrated below, this offers improved yield from the plant, while at the same time avoiding unnecessary use of resources such as water and/or nutrients.

The preferred irrigation strategy shown in FIG. 7B comprises the first, second and third periods described above. However, there is a substantial difference in the values that are used to operate the irrigation strategy during these periods. In particular, the difference between the desired water content at the minimum point during the first period and the constant level during the second period is significantly reduced. This difference between these two levels in the strategy shown in FIG. 7B is 15%, as compared with a difference of 35% in the strategy of FIG. 7A. In general, it is preferred that the difference is less than 25%, more preferably less than 20%.

Despite this smaller difference, it is found that a sufficiently strong generative impulse can be imparted to the plants, due to the fact that a single block system is used in combination with a slab of an appropriate size, as described above. As can be seen from FIG. 7B, this allows the variation of the actual achieved water level from the desired water level to be significantly smaller than was the case previously.

The small variation in the desired water content level required for the generative impulse and subsequent sustainable growth during the second period offers a number of advantages. In particular, the time required to go between substantially generative and substantially vegetative growth is much reduced, allowing the grower to obtain fruit significantly earlier in the season. This is reflected in the fact that the second period of constant water level is initiated at approximately week 15 in the strategy shown in FIG. 7A, whereas the same period of growth is initiated around week 10 in the strategy of FIG. 7B. This represents a significant advantage to the grower, who is able to obtain fruit earlier, at a time of year where it is relatively costly.

FIGS. 7A and 7B show the yearly progression of the desired water content level. However, it should be recognised that there are also variations in the water content level each day, according to the time at which irrigation is applied and the level of transpiration of the plant (which will be affected by the hours of sunlight and other criteria). Therefore, it should be understood that the desired water content referred to with respect of the irrigation strategies above is the desired water content immediately after irrigation each day. That is, when the plants are provided with water, this is done in an attempt to reach the desired water content as referred to above.

In the example of FIG. 7B, the minimum desired water content level during the first period is around 60%, while the constant desired water content level of the second period is around 70%. More generally, it is preferred that the minimum level is at least 50%, and more preferably at least 60%. Similarly, the constant level is preferably less than 80%, and in particularly preferred embodiments is in the range 73% to 78%.

The skilled person will recognise that the specific values and the lengths of the time periods given during the strategy of FIG. 7B may be varied while remaining in accordance with the present invention. For example, variations may be carried out on the basis of the plants that are grown or climatic conditions. Nevertheless, it is a characteristic of preferred irrigation strategies that steering between generative and vegetative states can be achieved by relatively small changes in desired water content.

The difference between the irrigation strategies of FIGS. 7A and 7B can be understood further with reference to FIGS. 8A to 8D. These Figures show the results of a trial between 17 Aug. 2011 and 1 Nov. 2011 in which a comparison was made between an irrigation strategy according to the preferred embodiment such as that of FIG. 7B and a conventional irrigation strategy such as that shown in FIG. 7A. Each type of strategy was applied to an array of nine plant growth systems, each comprising a single slab and a single plant-containing block as described above, and results were compared. Each array of plant growth systems shared a single gutter to receive drained liquid from their drain holes. The values shown in FIGS. 8A to 8D represent the second period of the strategy, during which the desired water content is maintained relatively constant.

Figure 8A:
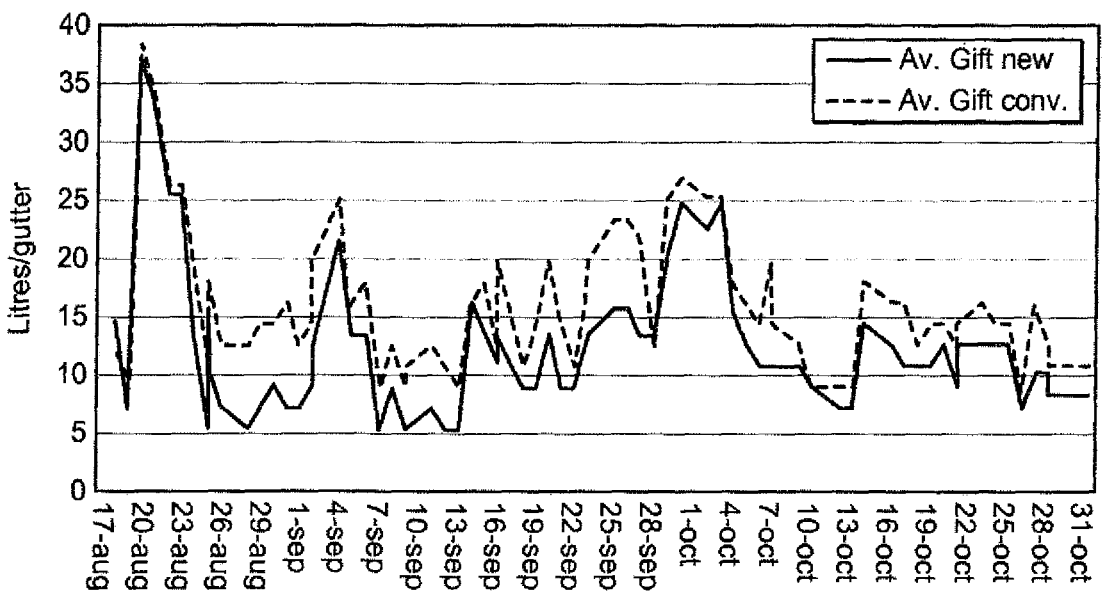
FIG. 8A illustrates the volume of water and nutrient solution applied to an array of nine plant growth systems daily during a new irrigation strategy in accordance with the present invention and a conventional irrigation strategy.
Figure 8B:
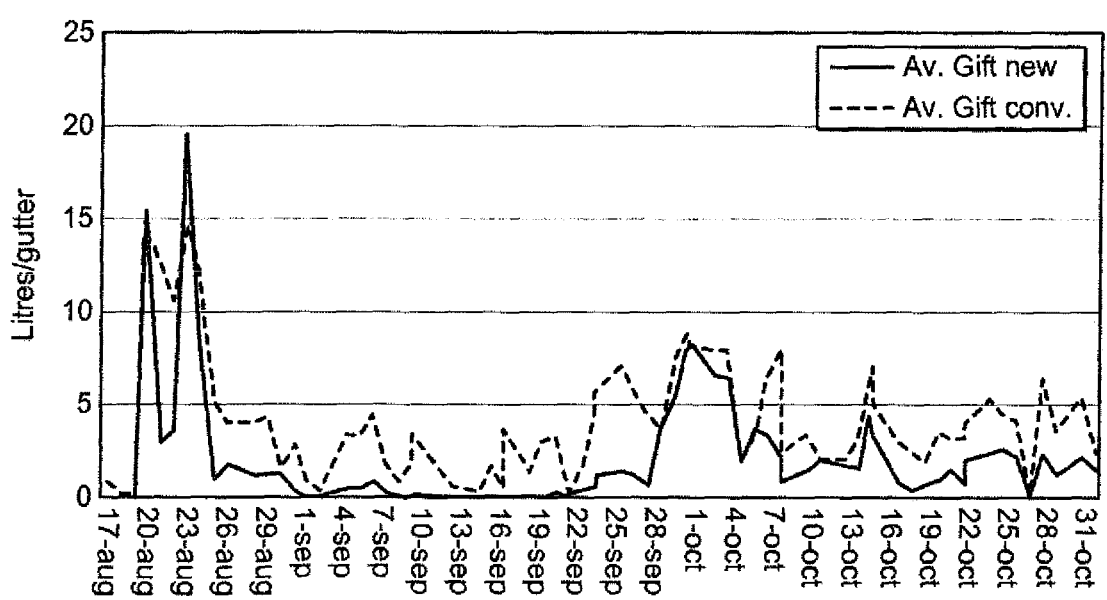
FIG. 8B illustrates the accumulated daily drain of the array of nine plant growth systems during a new irrigation strategy in accordance with the present invention and a conventional irrigation strategy.

FIG. 8A shows the daily volume of water and nutrient solution applied to the array of nine plant growth systems in both irrigation strategies. As can be seen from FIG. 8A, the average "Gift" (defined as the volume of water and nutrient solution provided per gutter per day) is significantly lower for the preferred strategy of FIG. 7B than for the conventional strategy of FIG. 7A. FIG. 8B shows the daily drain of liquid through the drain hole for the nine plant growth systems associated with the gutter. Again, on average this drain is significantly lower for the preferred irrigation strategy than for the conventional irrigation strategy.

Figures 8C, 8D:
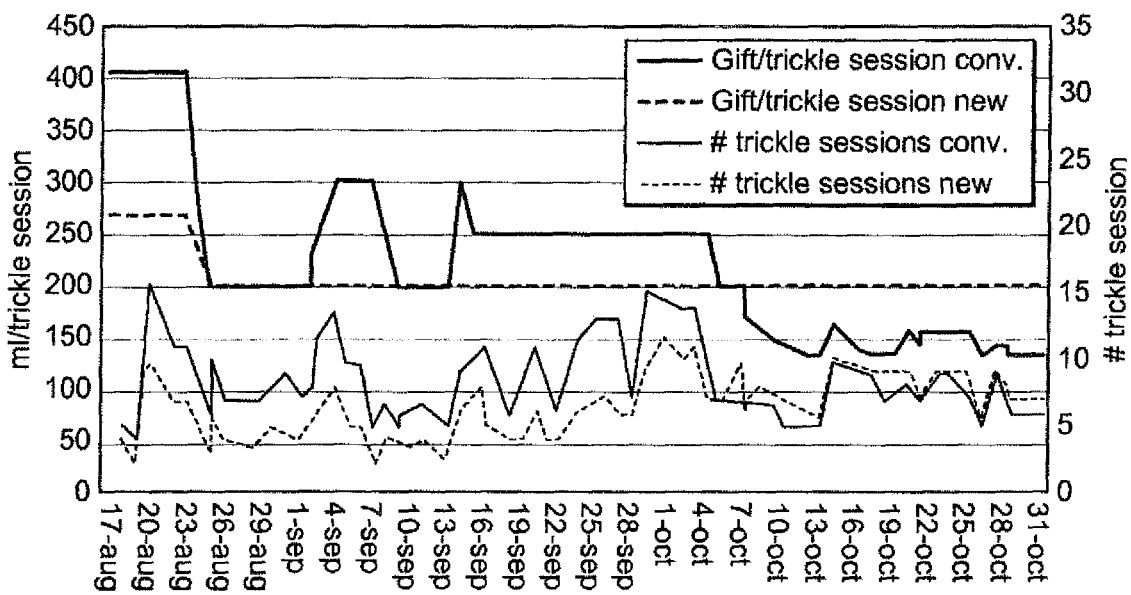
FIG. 8C illustrates the number of trickle sessions each day and the volume of water and nutrient solution applied during each trickle session for a new irrigation strategy in accordance with the present invention and a conventional irrigation strategy.
FIG. 8D provides a table summarising the results of FIGS. 8A to 8C.

The water and nutrient solution was provided to each plant growth system in multiple discrete "trickle sessions" each day. FIG. 8C illustrates the number of trickle sessions and the volume of liquid at each session during each day in the two irrigation strategies. The values of these parameters are adjusted through the irrigation process in dependence on factors such as climatic conditions, the levels of drain and measurements of plant growth. Given the dependence on the climate, the particular strategy shown in the example of FIG. 8C reflects the transition from summer to autumn during the period over which the trial was run. Particularly, as the level of sunlight and average temperature reduced, the amount of water and nutrient solution required also reduced. If the irrigation period had covered a transition from winter to spring, for example, one would have found a different trend in the volume of liquid provided to the plant growth systems.

FIG. 8D summarises the results shown in FIGS. 8A to 8C. In particular, the average gift, drain and uptake is given in litres for the array of plant growth systems for each of the irrigation strategies. Furthermore, the percentage of the gift which is taken by the plants (i.e. the uptake efficiency) and the percentage which is lost (i.e. the drain) is shown for each irrigation strategy. We can see from these figures, that the uptake efficiency is significantly increased using the preferred strategy. Moreover, the absolute drain, as well as the drain percentage, is substantially reduced using the preferred strategy. The preferred strategy therefore substantially reduced wastage. Moreover, the smaller absolute uptake which occurs using the preferred strategy reduces energy use for transpiration and also increases the applicability of the strategy in closed greenhouse systems.

Figure 9:
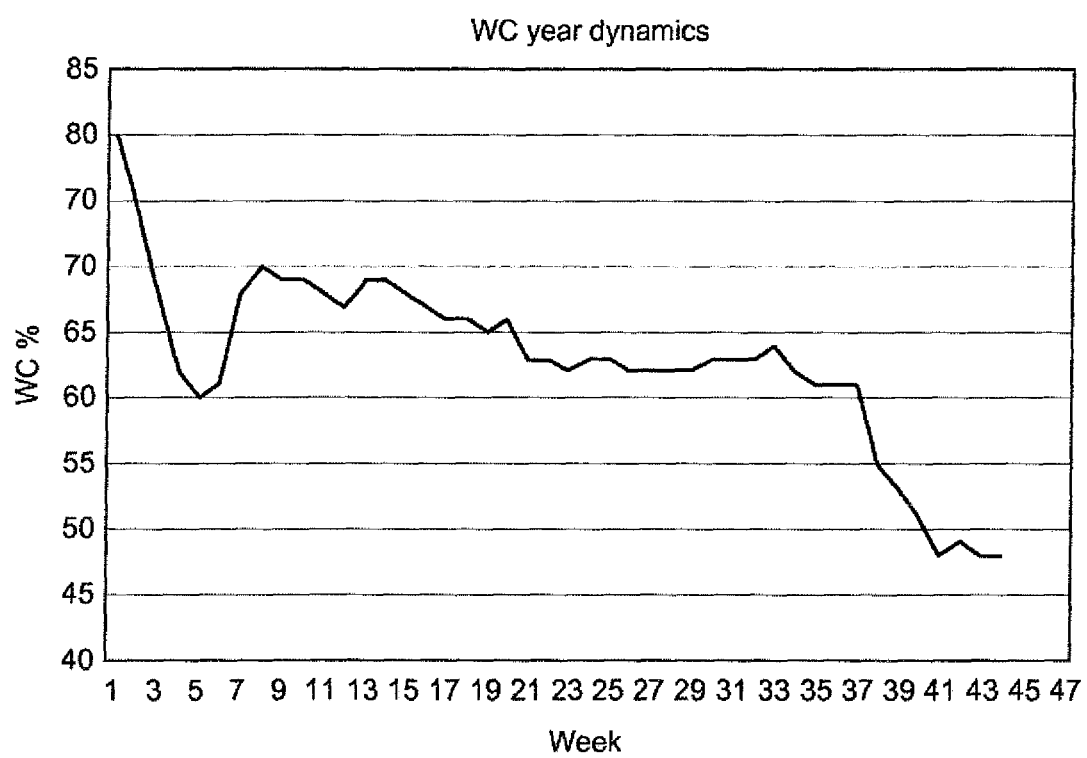
FIG. 9 illustrates an achieved water content level in a plant growth substrate over a long term study.

The achieved progression of the water content in the slab 1 when using a plant growth system according to a preferred embodiment was also measured in a further study over a longer time frame. The results are illustrated in FIG. 9. In FIG. 9, it can be seen that minimum water content of around 60% was achieved around 5 weeks from the beginning of the study. This minimum water content was found to provide the required generative impulse, and the water content level was subsequently raised to around 70% and remained in that region before gradually reducing later in the year. This 10% difference between minimum and constant levels was found to provide the necessary steering for the plant, and it was understood from the trial that a difference of 15% or less provides significant benefits.

Figure 10A:
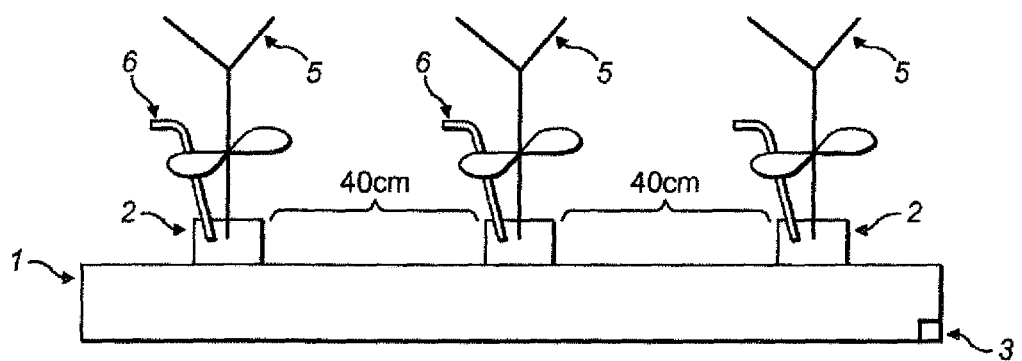
FIG. 10A illustrates a prior art plant growth system.
Figure 10B:
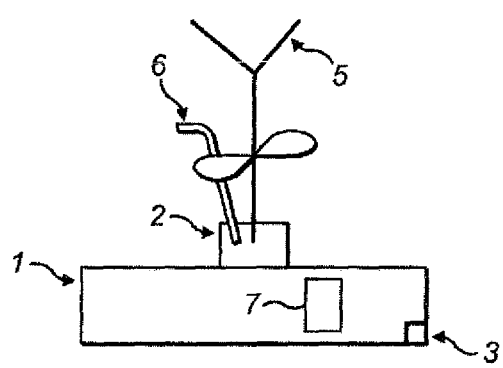
FIG. 10B illustrates a preferred embodiment of a plant growth system according to the present invention.

FIG. 10 onwards further demonstrate the advantages of the present invention. In particular, a comparison of a plant growth system fabricated in accordance with a preferred embodiment of the present invention and a prior art plant growth system was undertaken. FIG. 10B illustrates the embodiment of the present invention used for this comparison while FIG. 10A illustrates the plant growth system according to the prior art used for the comparison. The plant growth systems were used to grow tomato plants. As can be seen from the figures, each system comprised a single drain hole at one end of the slab. The prior art system comprises three separate blocks placed on the upper surface of the slab, whereas the embodiment of the invention comprises only a single block.

The slab of the preferred embodiment shown in FIG. 10B has dimensions of 450 mm*150 mm*100 mm (length*width*height) while the block has dimensions of 100 mm*100 mm*65 mm (length*width*height). The block is located 300 mm along the slab away from the drain hole (as measured from the centre of the block) and an irrigation device is provided to deliver a water and nutrient solution to the block at a distal side of the block to the drain hole.

The slab of the prior art shown in FIG. 10A has dimensions of 1330 mm*195 mm*75 mm (length*width*height) while the blocks have dimensions of 100 mm*100 mm*65 mm (length*width*height). The blocks are located at positions of 150 mm to 200 mm, 650 mm to 700 mm and 1100 to 1150 mm along the slab away from the drain hole (as measured from the centre of the block) and irrigation devices are provided for each block to deliver a water and nutrient solution to the block at a distal side of the block to the drain hole.

Identical new and conventional irrigation strategies were applied to the blocks of the plant growth systems of FIGS. 10A and 10B, and various properties of the system were measured. In particular, both water content (WC) and electrical conductivity (EC), together with the distribution of these properties, were measured.

Figure 11:
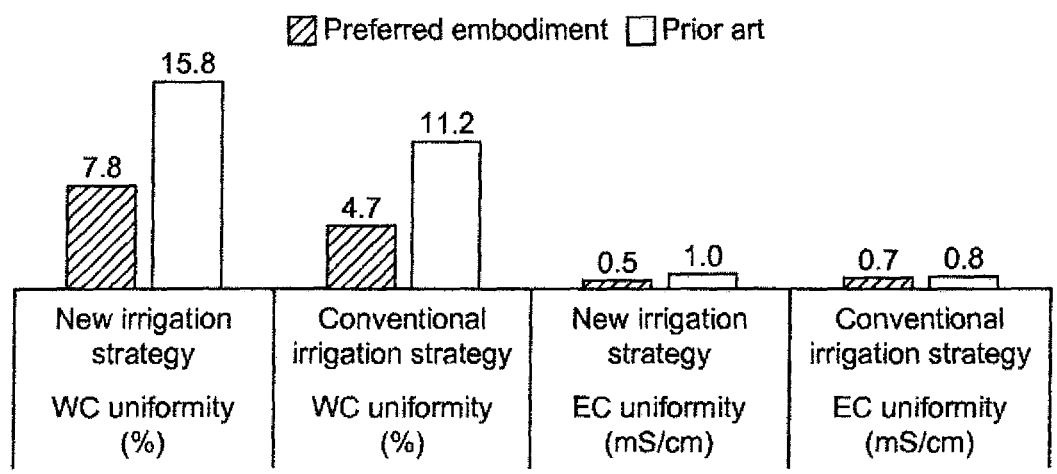
FIG. 11 shows the variation in the measured water content and electrical conductivity for the preferred embodiment of FIG. 10B and the prior art of FIG. 10A under both preferred and conventional irrigation strategies.

It is found that the uniformity of both the water content and the electrical conductivity is improved in the preferred embodiment as compared to the prior art. For example, FIG. 11 shows the variation in the measured water content and electrical conductivity for the preferred embodiment and the prior art under preferred and conventional irrigation strategies. The variation is measured between the upper layer and the lower layer of the slab. For both water content and electrical conductivity, and under both irrigation strategies, the variation is reduced using the preferred embodiment. The values used are the average variations exhibited during the trial. The reduced variation using the preferred embodiment represents an increased uniformity within the slab.

The reduced variation in water content has a particular effect on root growth. Since previous approaches typically resulted in a wetter bottom region of the slab 1, root growth was typically encouraged towards the bottom of the slab 1. By using slabs 1 according to the preferred embodiment of the present invention, it has been found that a significantly higher proportion of root growth occurs in the top of the slab. This results in a healthier plant, which can moreover be more closely controlled because new irrigation (for example, changing the water content or EC) reaches the root zone more quickly as it is closer to the irrigation device itself.

The improved water retention, water distribution and electrical conductivity (nutrient) distribution lead to improved growing conditions for the plants growing in the plant growth systems. Ultimately, this leads to an improved yield, as illustrated in FIG. 12.

Figure 12:
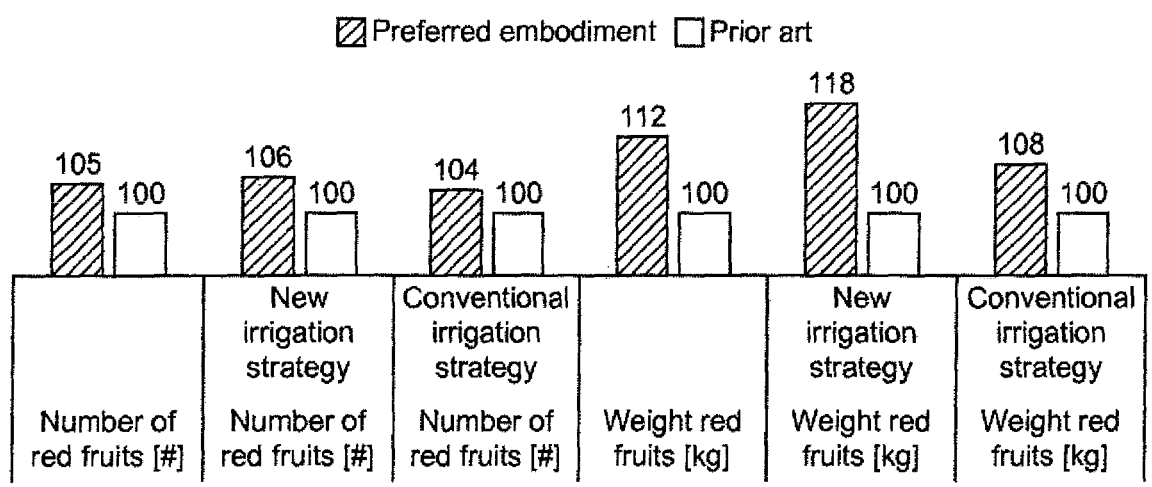
FIG. 12 shows a comparison of the achieved yield of red fruit for the preferred embodiment of FIG. 10B and the prior art of FIG. 10A for both preferred and conventional irrigation strategies.

In FIG. 12, the yield of red tomato plants achieved by the preferred embodiments is shown in terms of number and weight. Values are normalised such that the yield of the prior art gives a value of 100. The yield is presented for an average of both irrigation strategies and for the preferred and conventional irrigation strategies independently. As can be seen, in all circumstances, the yield of the preferred embodiment is superior to that of the prior art. Moreover, it is notable that the preferred embodiment offers particular advantages for a preferred strategy and in terms of the weight of fruit and/or flowers produced.

The advantages of the preferred embodiment are not limited to an improved yield, however. The ability to take advantage of the preferred growth strategy also reduces the amount of water and nutrients that must be provided to the plant growth system. Moreover, superior water retention means that less of this fluid is lost through the drain hole. Costs are reduced in terms of water and nutrient supply and in terms of the processing costs required to environmentally dispose of or re-use drained fluid. Thus, the approach taken by the preferred embodiment combines an improved yield with lower costs. This is achieved in light of the recognition that close control of the conditions of individual plants can be realised with the preferred plant growth systems described herein.

In addition to advantages in respect of the improved water retention, water distribution and nutrient distribution, the present invention also provides advantages in terms of nutrient refreshment efficiency. The nutrient refreshment efficiency reflects the rate at which old nutrients in the substrate can be replaced by new nutrients provided to the substrate in solution. It is preferable that nutrients can be refreshed in this way as efficiently as possible.

The advantages of the present invention were also observed during the further study referred to above with reference to FIG. 9. Over approximately a year, a preferred embodiment of the present invention was subjected to an irrigation strategy approximately in line with that reflected in FIG. 9. The preferred embodiment comprised a formaldehyde-free binder system as described above. The trial was also run with a similar slab using an alternative binder system and with a prior art plant growth system such as that shown in FIG. 10A above. The desired irrigation strategy applied to the each system was the same, although the difficulty in controlling water content accurately in the prior art system lead to a slight variation in measured water content over the period of the study.

Figure 13A:
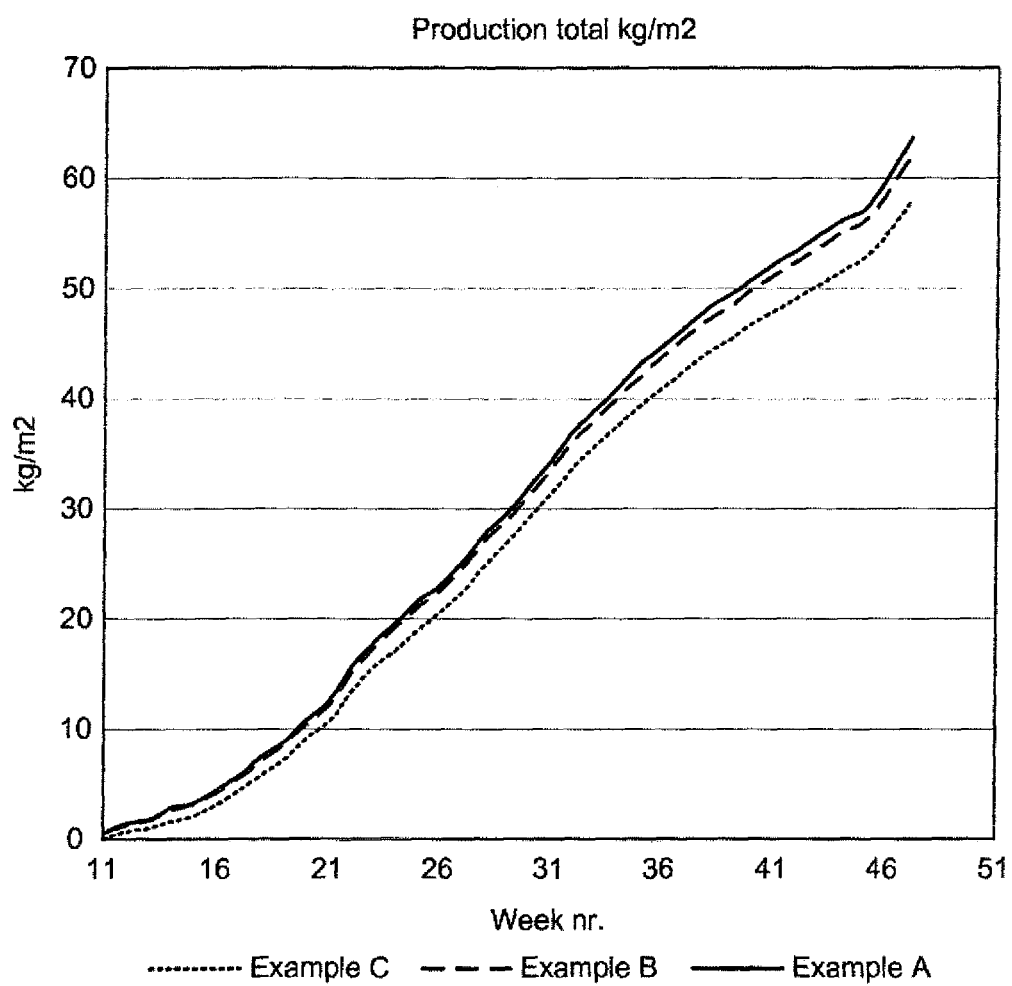
FIG. 13A illustrates total production over the long term study for a preferred embodiment of the present invention compared to a substrate using an alternative binder and a prior art plant growth substrate.
Figure 13B:
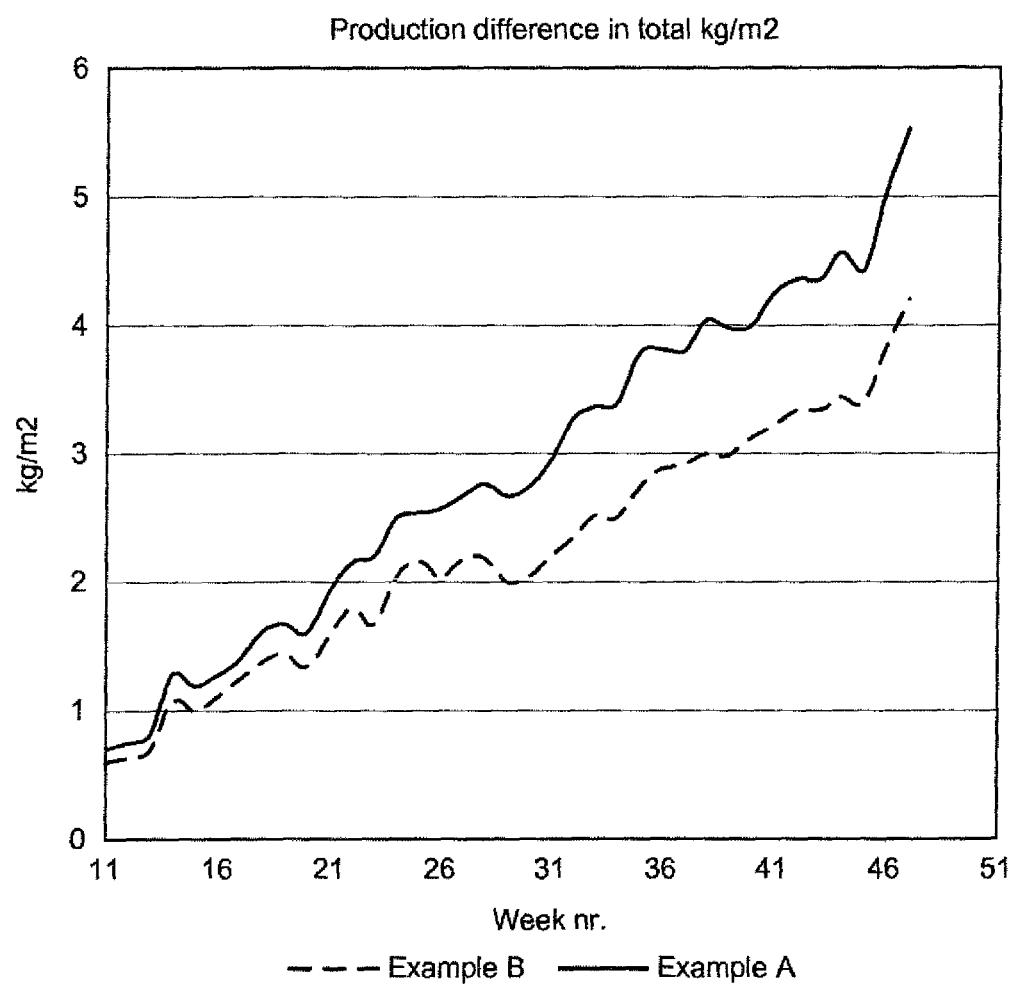
FIG. 13B illustrates the results shown in FIG. 13A using the production of the prior art plant growth substrate as a base figure.

FIGS. 13A and 13B illustrate the results of this study in terms of the total production of fruit achieved. FIG. 13A shows the total production of all three plant growth systems, and the development of this over the period of the study. In FIG. 13A, the unbroken line represents the results for the plant growth system of the preferred embodiment (referred to as Example A) using a preferred formaldehyde-free binder as described above while the dashed line represents the results for the system of similar proportions using an alternative, phenyl-urea formaldehyde (PUF) binder (referred to as Example B). Finally, the dotted line represents the production achieved with the prior art system (referred to as Example C). FIG. 13B brings the differences between the various systems into even greater relief by showing the differences for the preferred embodiment (unbroken line—Example A) and system adopting an alternative binder (dashed line—Example B) compared to the prior art system.

It can be seen from FIGS. 13A and 13B that the significant performance improvements were achieved in comparison with the prior art system. Furthermore, the benefits of the improved binder system of the preferred embodiment are also clear. Over 47 weeks, the total production per unit area for the preferred embodiment was 63.5 kg/m2, that of the alternative system using an alternative binder was 62.2 kg/m2, and that of the prior art system was 58.0 kg/m2.

Figure 14:
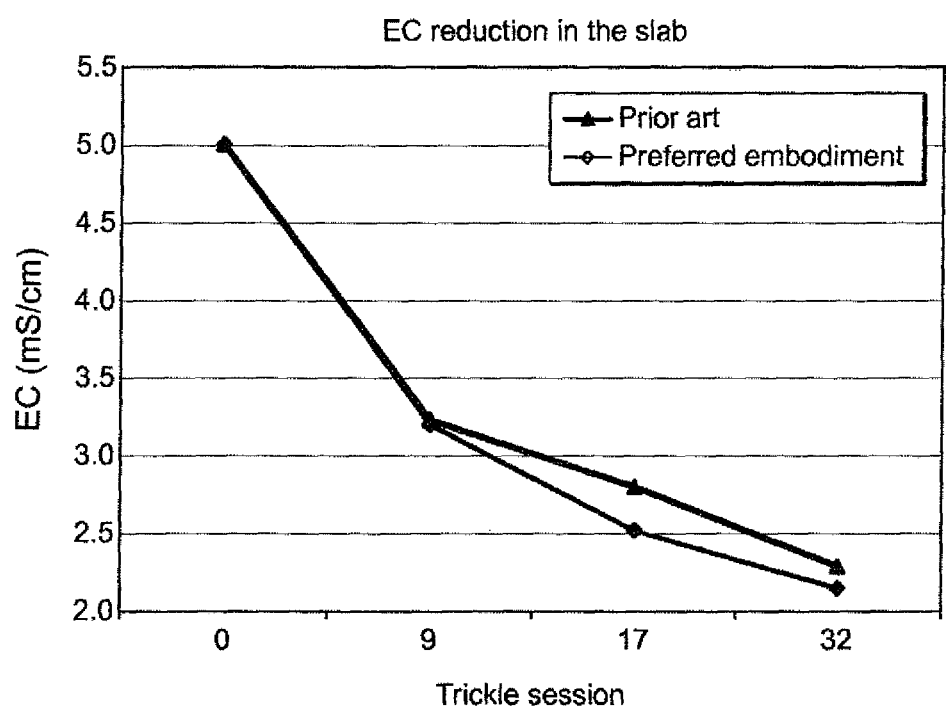
FIG. 14 compares the rate of change of the EC level of a slab for a preferred embodiment of the present invention and a prior art approach when a solution having a different EC level to that initially present in the slab is introduced by irrigation.

FIG. 14 shows the advantage of an embodiment of the present invention compared to a prior art substrate (as reflected in FIGS. 10A and 10B above) in terms of improved nutrient refreshment efficiency. In this trial, each slab was initially provided with a nutrient solution having an EC of 5. Once the EC of 5 was established in the substrate, the substrate was irrigated with a solution having an EC of 2. It can be appreciated that if the solution within the substrate is replaced by the new solution of EC 2 then the EC of the substrate itself will also tend to a value of 2. The faster the rate at which this happens, the more efficient is the replacement of nutrients within the solution.

As can be seen from FIG. 14, the preferred embodiment of FIG. 10B offers a faster change in EC than the prior art approach of FIG. 10A. This demonstrates the improved nutrient refreshment efficiency of the preferred embodiment.

Improvements in nutrient refreshment efficiency offer a number of advantages. In particular, the unwanted build up of nutrients in areas of the substrate can be avoided, and the nutrient level can be closely controlled according to the requirements of the plant.

Further advantages in terms of the control of EC levels can be realised through the preferred placement of the block 2 upon the slab 1. Evidence of this can be found in FIGS. 15A and 15B. In each Figure, measurements of EC were taken at multiple distances from the drain hole at one end of the slab 1 and at multiple heights.

Figure 15A:
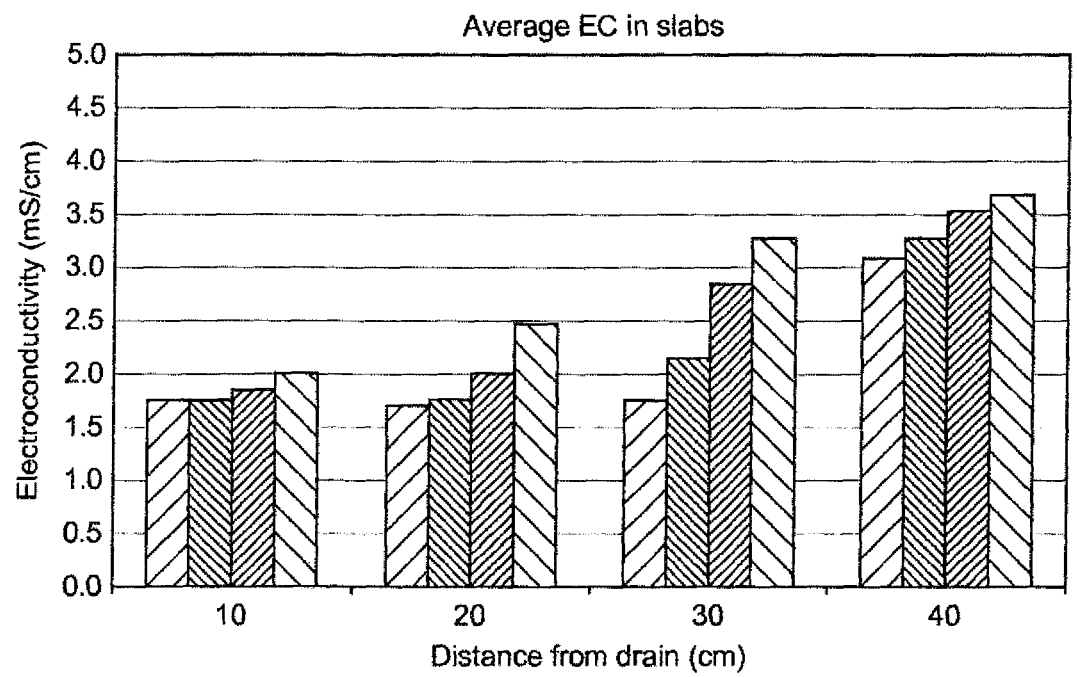
FIG. 15A illustrates the EC level at different points of a slab when a block is located towards the drain hole.

In FIG. 15A, the block 2 was placed at 20 cm from the drain hole on a block of length 50 cm. Measurements were taken at heights of 5.0 cm, 3.75 cm, 2.5 cm and 1.25 cm from the bottom of the block 1. For each distanced from the drain hole, measurements are illustrated for each of these heights in the order from left to right in FIG. 15A from highest to lowest.

Figure 15B:
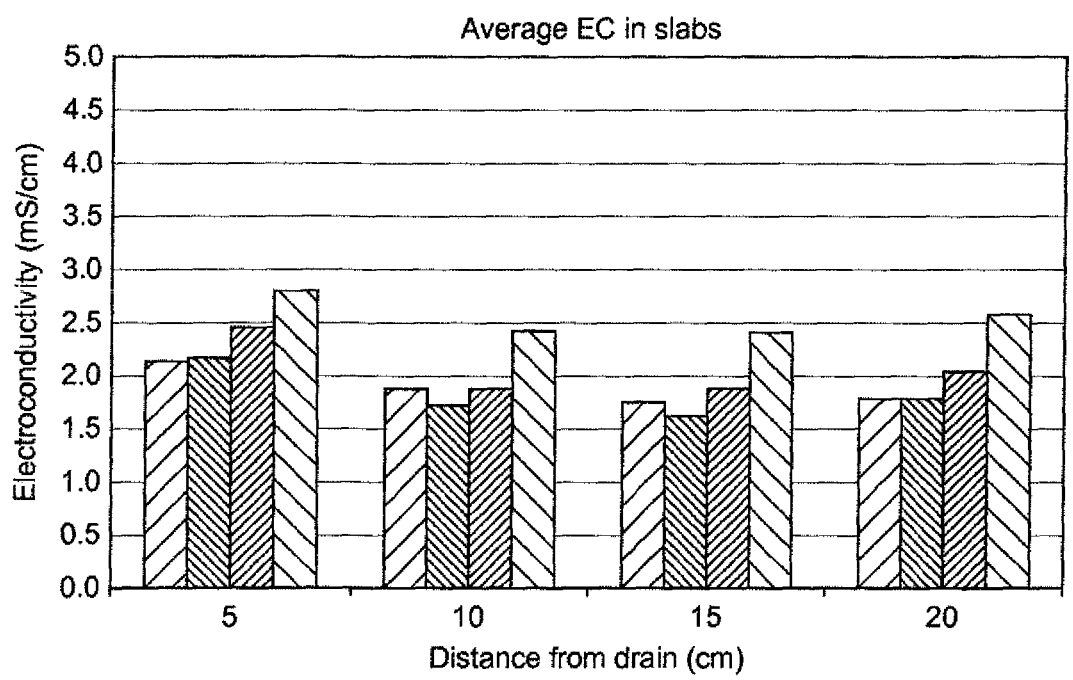
FIG. 15B illustrates the EC level at different points of a slab when a block is located away from the drain hole.

In FIG. 15B, the block 2 was placed at 25-30 cm from the drain hole of length 40 cm. Measurements were taken at heights of 6.8 cm, 5.1 cm, 3.4 cm and 1.7 cm from the bottom of the block 1. For each distanced from the drain hole, measurements are illustrated for each of these heights in the order from left to right in FIG. 15B from highest to lowest.

The variation in EC levels was found to be significantly greater in the examples shown in FIG. 15A than in that shown in FIG. 15B. More particularly, the standard deviation of EC was found to be around 0.73 in the example of FIG. 15A against a significantly smaller standard deviation of 0.37 for FIG. 15B. The figures illustrate improved uniformity both a differing heights and at differing distances from the drain hole for the example of FIG. 15B in which the block is placed over 50% of the length of the block away from the drain hole.

Variations and modifications to the embodiments described above will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A man-made vitreous fibre (MMVF) plant growth substrate comprising a coherent slab having the following properties:
   (a) a total volume in the range 3 to 15 litres,
   (b) a first slab layer of MMVF having a density in the range 40 to 90 kg/m$^3$,
   (c) in interfacial contact with the first slab layer, a second slab layer of MMVF having a density in the range 35 to 85 kg/m$^3$ that is lower than the density of MMVF of first slab layer; and
   (d) the MMVF of both slab layers is bonded by an organic binder selected from formaldehyde-free binders;
   wherein the substrate further comprises a liquid impermeable covering surrounding the first and second slab layers, the covering having a first opening disposed on a first face of the slab adjacent to the first slab layer and is provided for engagement of the first slab layer with a plant-containing man made vitreous fibre block;
   whereby the liquid impermeable covering provides closer control of plant growth conditions.

2. The substrate according to claim 1, wherein, in use, the first slab layer of MMVF is disposed above the second slab layer of MMVF.

3. The substrate according to claim 1, wherein the binder is comprised in a hydrophilic binding system.

4. The substrate according to claim 3, wherein the binder system comprises the binder and a wetting agent.

5. The substrate according to claim 4, wherein the binder system comprises an ionic surfactant.

6. The substrate according to claim 5, wherein the surfactant is an anionic surfactant.

7. The substrate according to claim 6, wherein the anionic surfactant is a linear alkyl benzene sulphonate anionic surfactant.

8. The substrate according to claim 1, wherein the binder is a reaction product of a polycarboxylic acid component and a polyol and/or an amine component.

9. The substrate according to claim 8, wherein the binder is a reaction product of a polycarboxylic acid or anhydride thereof, an amine, preferably an alkanolamine, and a sugar.

10. The substrate according to claim 9, wherein the sugar is a reducing sugar.

11. The substrate according to claim 8, wherein the binder is in admixture with a sugar component and/or a phenol.

12. The substrate according to claim 1, wherein at least one of the slab layers extends across an entire plane of the slab.

13. The substrate according to claim 12, wherein both of the slab layers extend across an entire plane of the slab.

14. The substrate according to claim 13, wherein the slab layers are of equal dimensions in the plane.

15. The substrate according to claim 1, wherein the density of the first slab layer is in the range 50 kg/m$^3$ to 80 kg/m$^3$.

16. The substrate according to claim 1, wherein the density of the second slab layer is in the range 45 kg/m$^3$ to 75 kg/m$^3$.

17. The substrate according to claim 1, wherein the thickness of the first slab layer is less than the thickness of the second slab layer.

18. The substrate according to claim 1, wherein the substrate further comprises a second opening provided on a second face of the slab adjacent to the second slab layer.

19. A plant growth system, comprising:
   the substrate of claim 1, and
   a single plant-containing man made vitreous fibre block in contact with the first slab layer.

20. The substrate according to claim 1, wherein the predominant fiber orientation of the first and second slab layers is horizontal.

21. The substrate according to claim 1, wherein a base is added to the organic binder.

* * * * *